United States Patent
Kiyotomi

(10) Patent No.: US 12,538,743 B2
(45) Date of Patent: Jan. 27, 2026

(54) WARPAGE AMOUNT ESTIMATION APPARATUS AND WARPAGE AMOUNT ESTIMATION METHOD

(71) Applicant: Tokyo Electron Limited, Tokyo (JP)

(72) Inventor: Akiko Kiyotomi, Koshi (JP)

(73) Assignee: Tokyo Electron Limited, Tokyo (JP)

( * ) Notice: Subject to any disclaimer, the term of this patent is extended or adjusted under 35 U.S.C. 154(b) by 342 days.

(21) Appl. No.: 18/249,630

(22) PCT Filed: Oct. 13, 2021

(86) PCT No.: PCT/JP2021/037850
§ 371 (c)(1),
(2) Date: Apr. 19, 2023

(87) PCT Pub. No.: WO2022/091779
PCT Pub. Date: May 5, 2022

(65) Prior Publication Data
US 2023/0386873 A1    Nov. 30, 2023

(30) Foreign Application Priority Data
Oct. 27, 2020  (JP) .................................. 2020-179639

(51) Int. Cl.
*H01L 21/67*   (2006.01)
*G01N 21/95*   (2006.01)
(Continued)

(52) U.S. Cl.
CPC ... *H01L 21/67288* (2013.01); *G01N 21/9501* (2013.01); *G06T 7/0004* (2013.01);
(Continued)

(58) Field of Classification Search
CPC .............. H01L 21/67288; H01L 22/12; G01N 21/9501; G01N 21/9503;
(Continued)

(56) References Cited

U.S. PATENT DOCUMENTS 10,180,316 B2 *   1/2019   Brodmann ............ B23Q 17/003
10,180,401 B2 *   1/2019   Ono ........................ G06F 18/24
(Continued)

FOREIGN PATENT DOCUMENTS

JP        2017-150849 A      8/2017

OTHER PUBLICATIONS

International Search Report of the International Searching Authority mailed Jan. 11, 2022 in corresponding International Application No. PCT/JP2021/037850 (and English translation).

*Primary Examiner* — Sumati Lefkowitz
*Assistant Examiner* — Ryan P Potts
(74) *Attorney, Agent, or Firm* — Posz Law Group, PLC

(57) ABSTRACT

A warpage amount estimation apparatus that estimates a warpage amount of a substrate includes a processor and a memory. The processor acquires a captured image of one surface of an estimation target substrate. The processor calculates a rate of change in pixel value relating to a substrate radial direction in the captured image of the one surface of the estimation target substrate. The processor estimates a warpage amount of the estimation target substrate based on a correlation obtained in advance between a rate of change in pixel value relating to the substrate radial direction in a captured image of the one surface of a substrate and a warpage amount of the substrate, and on a calculation result of the rate of change which is calculated.

20 Claims, 18 Drawing Sheets

(51) Int. Cl.
   *G06T 7/00*   (2017.01)
   *H01L 21/66*   (2006.01)

(52) U.S. Cl.
   CPC .......... *H01L 22/12* (2013.01); *G01B 2210/56* (2013.01); *G06T 2207/30148* (2013.01)

(58) Field of Classification Search
   CPC .......... G01N 2223/6116; G06T 7/0004; G06T 2207/30148; G06T 7/001; G01B 11/24; G01B 11/022; G01B 2210/56
   See application file for complete search history.

(56) References Cited

U.S. PATENT DOCUMENTS

| | | | | |
|---|---|---|---|---|
| 2012/0268742 | A1* | 10/2012 | Hatano | G01N 21/9501 356/237.5 |
| 2012/0274931 | A1* | 11/2012 | Otani | G01N 21/94 356/237.3 |
| 2015/0276616 | A1* | 10/2015 | Horn | H01L 22/12 348/87 |
| 2016/0078626 | A1* | 3/2016 | Kodama | H01L 21/681 382/149 |
| 2016/0344911 | A1* | 11/2016 | Wang | G02B 7/285 |
| 2017/0243738 | A1* | 8/2017 | Noda | H01L 21/0274 |
| 2020/0105557 | A1* | 4/2020 | Yeh | G01B 11/306 |

* cited by examiner

WARPAGE AMOUNT ESTIMATION APPARATUS AND WARPAGE AMOUNT ESTIMATION METHOD

CROSS REFERENCE TO RELATED APPLICATION

This application is a U.S. national stage application of PCT/JP2021/037850 filed on Oct. 13, 2021, which is based on and claims the benefit of priority of the prior Japanese Patent Application No. 2020-179639 filed on Oct. 27, 2020, the entire contents of which are incorporated herein by reference.

TECHNICAL FIELD

This disclosure relates to a warpage amount estimation apparatus and a warpage amount estimation method.

BACKGROUND ART

The wafer treatment method disclosed in Patent Document 1 includes the steps of: imaging, with a camera, an end surface of a reference wafer over the entire peripheral edge of the reference wafer whose warpage amount is known, to acquire shape data on the end surface of the reference wafer over the entire peripheral edge of the reference wafer; imaging, with a camera, an end surface of a wafer over the entire peripheral edge of the wafer, to acquire shape data on the end surface of the wafer over the entire peripheral edge of the wafer; and calculating a warpage amount of the wafer on the basis of the shape data. The above treatment method further includes the steps of: forming a resist film on a front surface of the wafer; and deciding a supply position of an organic solvent to a peripheral edge portion of the resist film on the basis of the warpage amount, and dissolving the peripheral edge portion with the organic solvent supplied from the supply position to remove it from the top of the wafer.

PRIOR ART DOCUMENT

Patent Document

Patent Document 1: Japanese Laid-open Patent Publication No. 2017-150849

DISCLOSURE OF THE INVENTION

Problems to be Solved by the Invention

The technique according to this disclosure makes it possible to estimate a warpage amount of a substrate without increasing the size of an apparatus even when the warpage of the substrate is large.

Means for Solving the Problems

An aspect of this disclosure is a warpage amount estimation apparatus for estimating a warpage amount of a substrate, including: an acquirer configured to acquire a captured image of one surface of an estimation target substrate; a calculator configured to calculate a rate of change in pixel value relating to a substrate radial direction in the captured image of the one surface of the estimation target substrate; and an estimator configured to estimate a warpage amount of the estimation target substrate based on a correlation obtained in advance between a rate of change in pixel value relating to the substrate radial direction in a captured image of the one surface of a substrate and a warpage amount of the substrate, and on a calculation result by the calculator.

Effect of the Invention

According to this disclosure, it is possible to estimate a warpage amount of a substrate without increasing the size of an apparatus even when the warpage of the substrate is large.

EMBODIMENTS FOR CARRYING OUT THE INVENTION

In a manufacturing process of a semiconductor device or the like, predetermined treatments for forming a resist pattern on a semiconductor wafer (hereinafter, referred to as a "wafer" in some cases) are performed. The predetermined treatments are, for example, a resist coating treatment of supplying a resist solution onto the wafer to form a resist film, an exposure treatment of exposing the resist film into a predetermined pattern, a PEB treatment of heating so as to promote a chemical reaction in the resist film after the exposure, a developing treatment of developing the exposed resist film, and so on. Further, an EBR (Edge Bead Removal) treatment of removing the resist film at a peripheral edge portion of the wafer is performed in some cases when forming the resist pattern.

Before or after any of the above treatments, warpage has occurred in the wafer in some cases. A warpage amount of the wafer can be used for adjustment of treatment conditions (for example, adjustment of conditions of the EBR treatment) or the like, and thus there is a great need for its measurement and estimation.

Therefore, for example, an end surface of the wafer is imaged by a camera over the entire peripheral edge of the wafer and the warpage amount of the wafer is calculated based on an imaging result as disclosed in Patent Document 1.

Incidentally, since a plurality of films are formed on the wafer recently in a field of a 3D NAND-type semiconductor device or the like, the warpage of the wafer has come to be large up to, for example, about 1 mm with the stress of the films or the like. In the case where the warpage of the wafer is large as above, a moving mechanism for moving an imaging system including the camera in a height direction may be needed to calculate the warpage amount of the wafer based on the imaging result of a peripheral end surface of the wafer by the camera as disclosed in Patent Document 1. In this case, the apparatus increases in size by a mounting space for the moving mechanism. Further, there is a conceivable method of expanding an imaging field of view of the camera without providing the above moving mechanism so as to image the peripheral end surface of the wafer with large warpage, but a space is needed also to expand the imaging field of view, leading to an increase in size of the apparatus.

Hence, the technique according to this disclosure makes it possible to estimate a warpage amount of a substrate without increasing the size of an apparatus even when the warpage amount of the substrate is large.

Hereinafter, a warpage amount estimation apparatus and a warpage amount estimation method according to this embodiment will be explained with reference to the drawings. Note that in this description and the drawings, the same codes are given to elements having substantially the same functional configurations to omit duplicate explanations.

Figure 1:
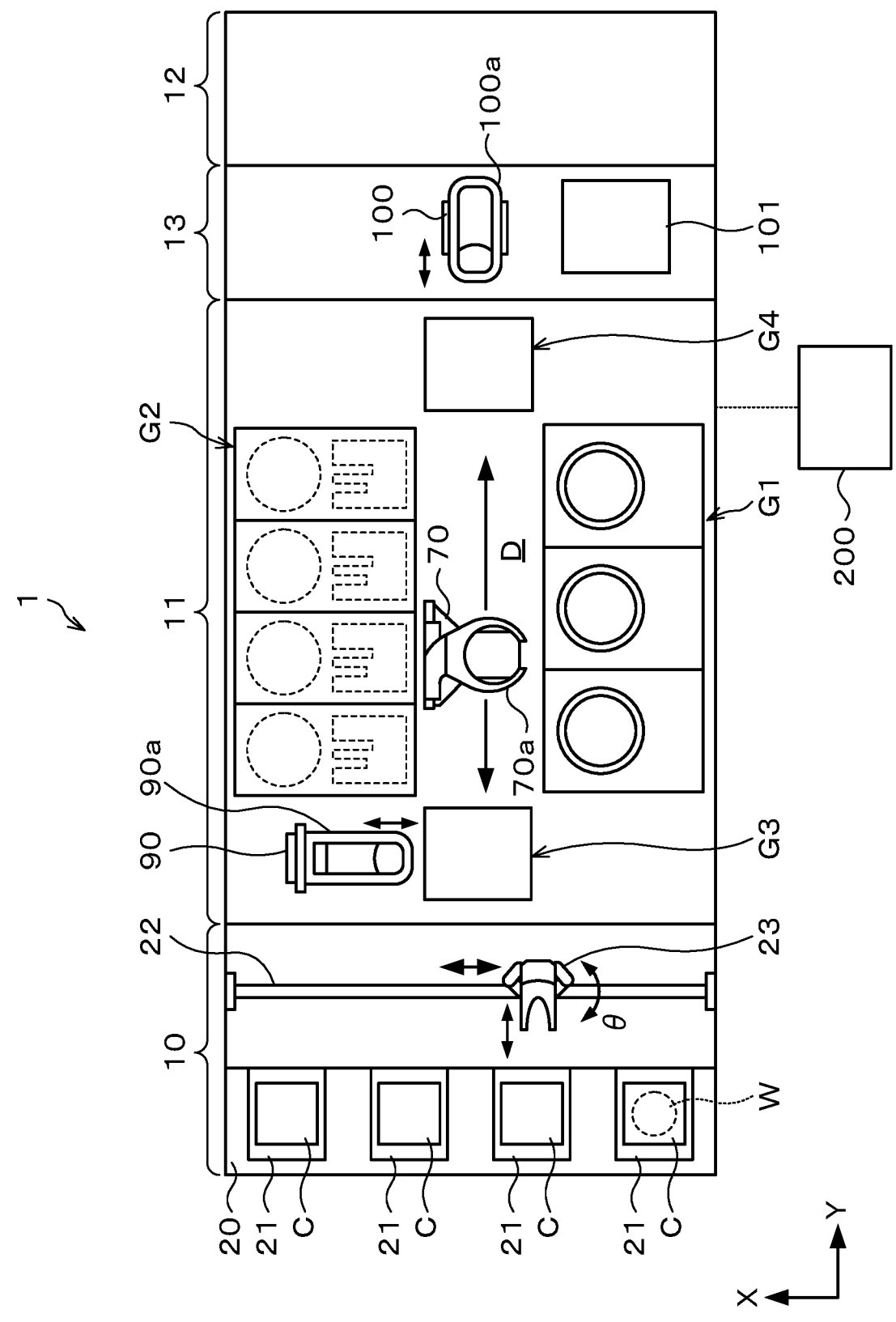
FIG. 1 is a plan view illustrating the outline of a configuration of a wafer treatment system including a warpage amount estimation apparatus according to this embodiment.
Figure 2:
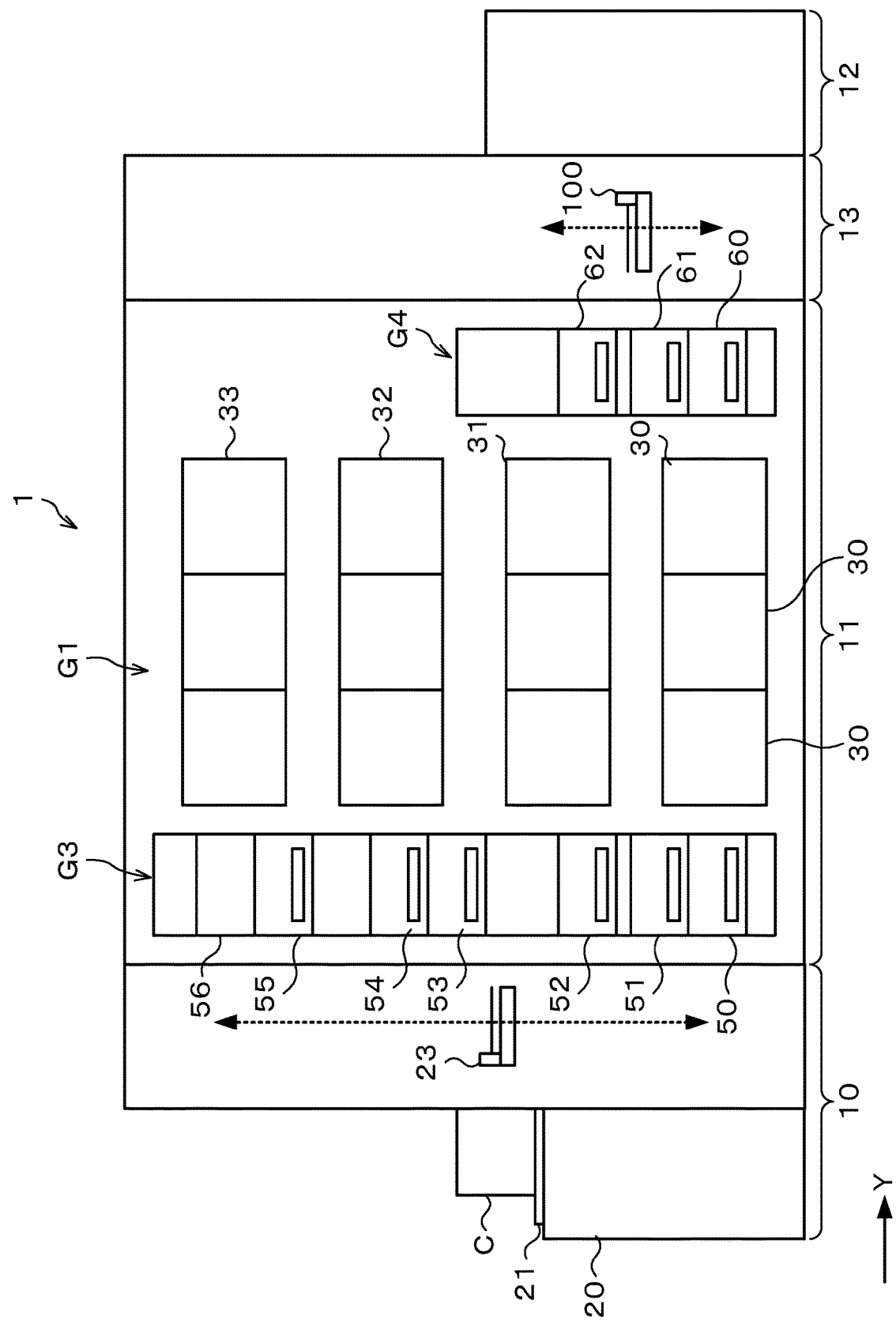
FIG. 2 is a view schematically illustrating the outline of an internal configuration on a front side of the wafer treatment system according to this embodiment.
Figure 3:
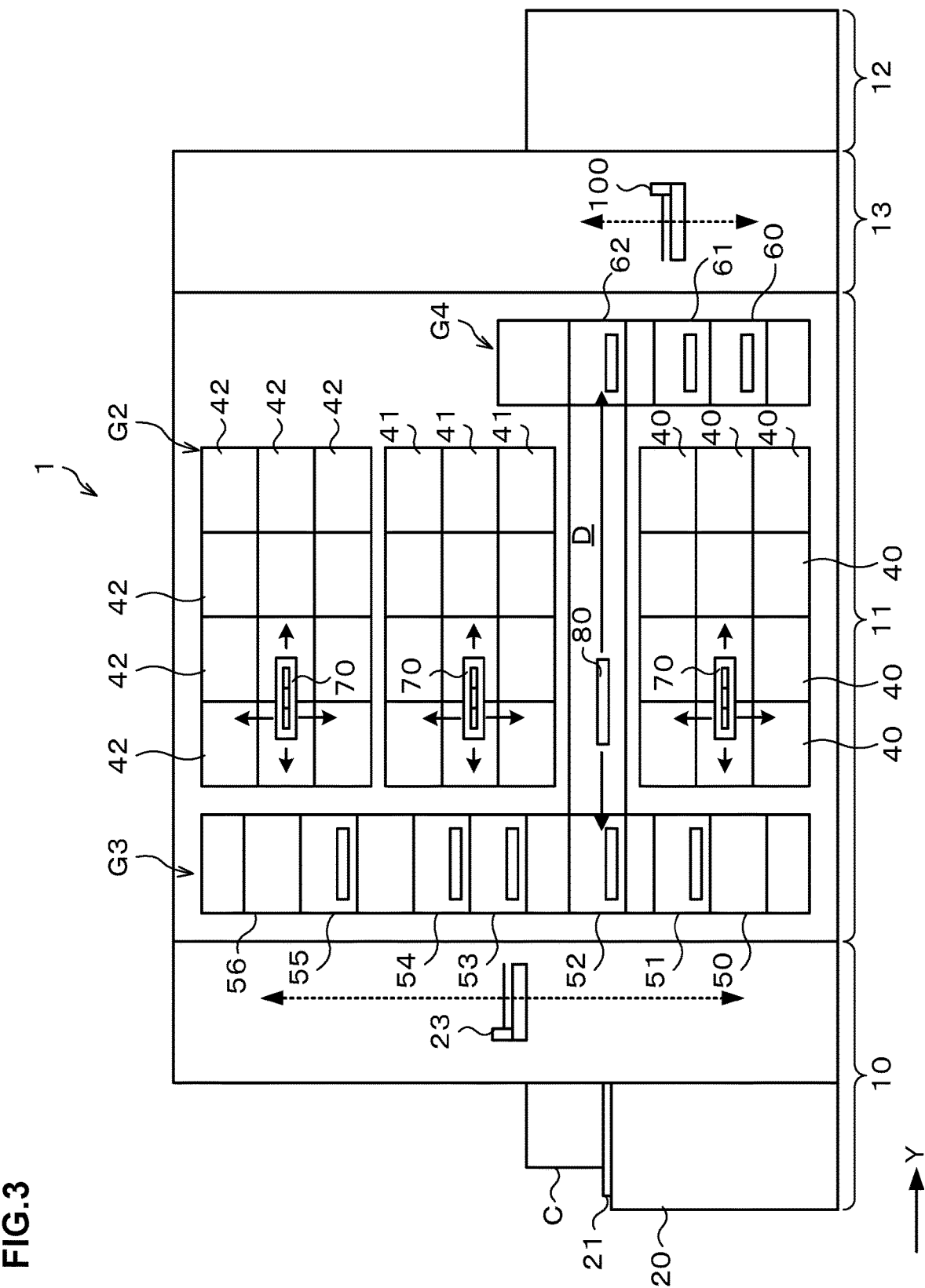
FIG. 3 is a view schematically illustrating the outline of the internal configuration on a rear side of the wafer treatment system according to this embodiment.

FIG. 1 is a plan view illustrating the outline of a configuration of a wafer treatment system 1 including the warpage amount estimation apparatus according to this embodiment. FIG. 2 and FIG. 3 are views schematically illustrating the outline of an internal configuration on a front side and a rear side of the wafer treatment system 1, respectively. Note that this embodiment illustrates a case where the wafer treatment system 1 is a coating and developing treatment system which performs coating and developing treatments on the wafer W as an example.

The wafer treatment system 1 has, as illustrated in FIG. 1, a cassette station 10 into/out of which a cassette C housing a plurality of wafers W is transferred, and a treatment station 11 including a plurality of various treatment apparatuses which perform the predetermined treatments on the wafer W. The wafer treatment system 1 has a configuration in which the cassette station 10, the treatment station 11, and an interface station 13 which delivers the wafer W to/from an exposure apparatus 12 adjacent to the treatment station 11 are integrally connected.

In the cassette station 10, a cassette stage 20 is provided. On the cassette stage 20, a plurality of cassette stage plates 21 are provided on which the cassettes C are mounted when the cassettes C are transferred in/out from/to the outside of the substrate treatment system 1.

In the cassette station 10, a wafer transfer apparatus 23 is provided which is movable on a transfer path 22 extending in an X-direction. The wafer transfer apparatus 23 is movable also in an up-down direction and around a vertical axis (in a θ-direction), and can transfer the wafer W between the cassette C on each of the cassette stage plates 21 and a later-explained delivery apparatus in a third block G3 in the treatment station 11.

In the treatment station 11, a plurality of, for example, four blocks G1, G2, G3, G4 each including various apparatuses are provided. For example, the first block G1 is provided on the front side (X-direction negative direction side in FIG. 1) in the treatment station 11, and the second block G2 is provided on the rear side (X-direction positive direction side in FIG. 1) in the treatment station 11. Further, the third block G3 is provided on the cassette station 10 side (Y-direction negative direction side in FIG. 1) in the treatment station 11, and the fourth block G4 is provided on the interface station 13 side (Y-direction positive direction side in FIG. 1) in the treatment station 11.

In the first block G1, as illustrated in FIG. 2, a plurality of solution treatment apparatuses, for example, a developing treatment apparatus 30, a lower anti-reflection film forming apparatus 31, a resist coating apparatus 32, and an upper anti-reflection film forming apparatus 33 are arranged in this order from the bottom. The developing treatment apparatus 30 is intended to perform a developing treatment on the wafer W, and the lower anti-reflection film forming apparatus 31 is intended to form an anti-reflection film (hereinafter, referred to as a "lower anti-reflection film") at a lower layer of a resist film of the wafer W. The resist coating apparatus 32 is intended to apply a resist solution to the wafer W to form a resist film, and the upper anti-reflection film forming apparatus 33 is intended to form an anti-reflection film (hereinafter, referred to as an "upper anti-reflection film") at an upper layer of the resist film of the wafer W.

The developing treatment apparatus 30, the lower anti-reflection film forming apparatus 31, the resist coating apparatus 32, and the upper anti-reflection film forming apparatus 33 are provided, for example, three each arranged side by side in a horizontal direction. Note that the numbers and the arrangement of the developing treatment apparatuses 30, the lower anti-reflection film forming apparatuses 31, the resist coating apparatuses 32, and the upper anti-reflection film forming apparatuses 33 can also be arbitrarily selected.

In each of the developing treatment apparatus 30, the lower anti-reflection film forming apparatus 31, the resist coating apparatus 32, and the upper anti-reflection film forming apparatus 33, for example, spin coating of applying a predetermined coating solution onto the wafer W is performed. In the spin coating, the coating solution is discharged onto the wafer W, for example, from a coating nozzle and the wafer W is rotated to diffuse the coating solution over the front surface of the wafer W.

Note that in this embodiment, it is assumed that the resist coating apparatus 32 is configured to be able to execute also the EBR treatment of annularly removing the resist film at the peripheral edge portion of the wafer W.

In the second block G2, as illustrated in FIG. 3, thermal treatment apparatuses 40 each of which performs a thermal treatment such as heating and cooling on the wafer W, adhesion apparatuses 41 each of which enhances the fixation between the resist solution and the wafer W, and edge exposure apparatuses 42 each of which exposes the outer peripheral portion of the wafer W, are provided. The thermal treatment apparatuses 40, the adhesion apparatuses 41, and the edge exposure apparatuses 42 are provided one above the other in the up-down direction and side by side in the horizontal direction, and the numbers and the arrangement of the apparatuses can be arbitrarily selected.

In the third block G3, for example, a plurality of delivery apparatuses 50, 51, 52, 53, 54, 55, and an inspection apparatus 56 as a substrate inspection apparatus are provided in order from the bottom. The configuration of the inspection apparatus 56 will be explained later. Further, in the fourth block G4, a plurality of delivery apparatuses 60, 61, 62 are provided in order from the bottom.

As illustrated in FIG. 1, in a region surrounded by the first block G1 to the fourth block G4, a wafer transfer region D is formed. In the wafer transfer region D, a wafer transfer apparatus 70 is arranged.

The wafer transfer apparatus 70 has a transfer arm 70*a* movable, for example, in the Y-direction, the X-direction, the θ-direction, and the up-down direction. The wafer transfer apparatus 70 can move in the wafer transfer region D and transfer the wafer W to a predetermined unit in the first block G1, the second block G2, the third block G3, and the fourth block G4 therearound. A plurality of the wafer transfer apparatuses 70 are arranged one above the other as illustrated in FIG. 3, each of which can transfer the wafer W, for example, to a predetermined unit at the same height in each of the blocks G1 to G4.

Further, in the wafer transfer region D, a shuttle transfer apparatus 80 is provided which linearly transfers the wafer W between the third block G3 and the fourth block G4.

The shuttle transfer apparatus 80 is configured to be linearly movable, for example, in the Y-direction in FIG. 3. The shuttle transfer apparatus 80 can move in the Y-direction while supporting the wafer W, and transfer the wafer W between the delivery apparatus 52 in the third block G3 and the delivery apparatus 62 in the fourth block G4.

As illustrated in FIG. 1, a wafer transfer apparatus 90 is provided adjacent to the third block G3 on the X-direction positive direction side. The wafer transfer apparatus 90 has a transfer arm 90*a* that is movable, for example, in the X-direction, the θ-direction, and the up-down direction. The wafer transfer apparatus 90 can move up and down while supporting the wafer W to transfer the wafer W to each of the delivery apparatuses in the third block G3.

In the interface station 13, a wafer transfer apparatus 100 and a delivery apparatus 101 are provided. The wafer transfer apparatus 100 has a transfer arm 100*a* that is movable, for example, in the Y-direction, the θ-direction, and the up-down direction. The wafer transfer apparatus 100 can transfer the wafer W to/from each of the delivery apparatuses in the fourth block G4, the delivery apparatus 101, and the exposure apparatus 12, for example, while supporting the wafer W by the transfer arm 100*a*.

Figure 4:
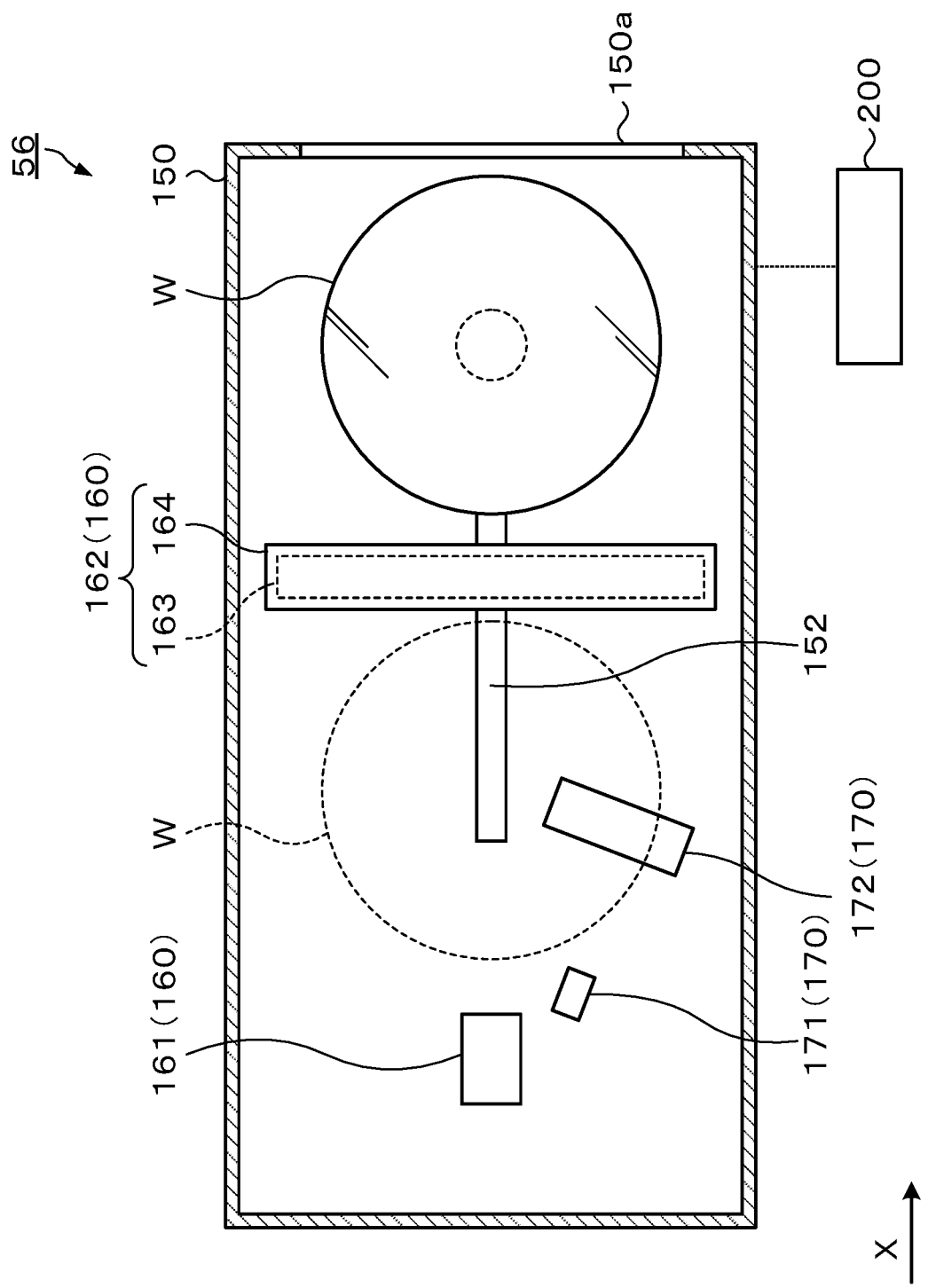
FIG. 4 is a transverse sectional view illustrating the outline of a configuration of an inspection apparatus.
Figure 5:
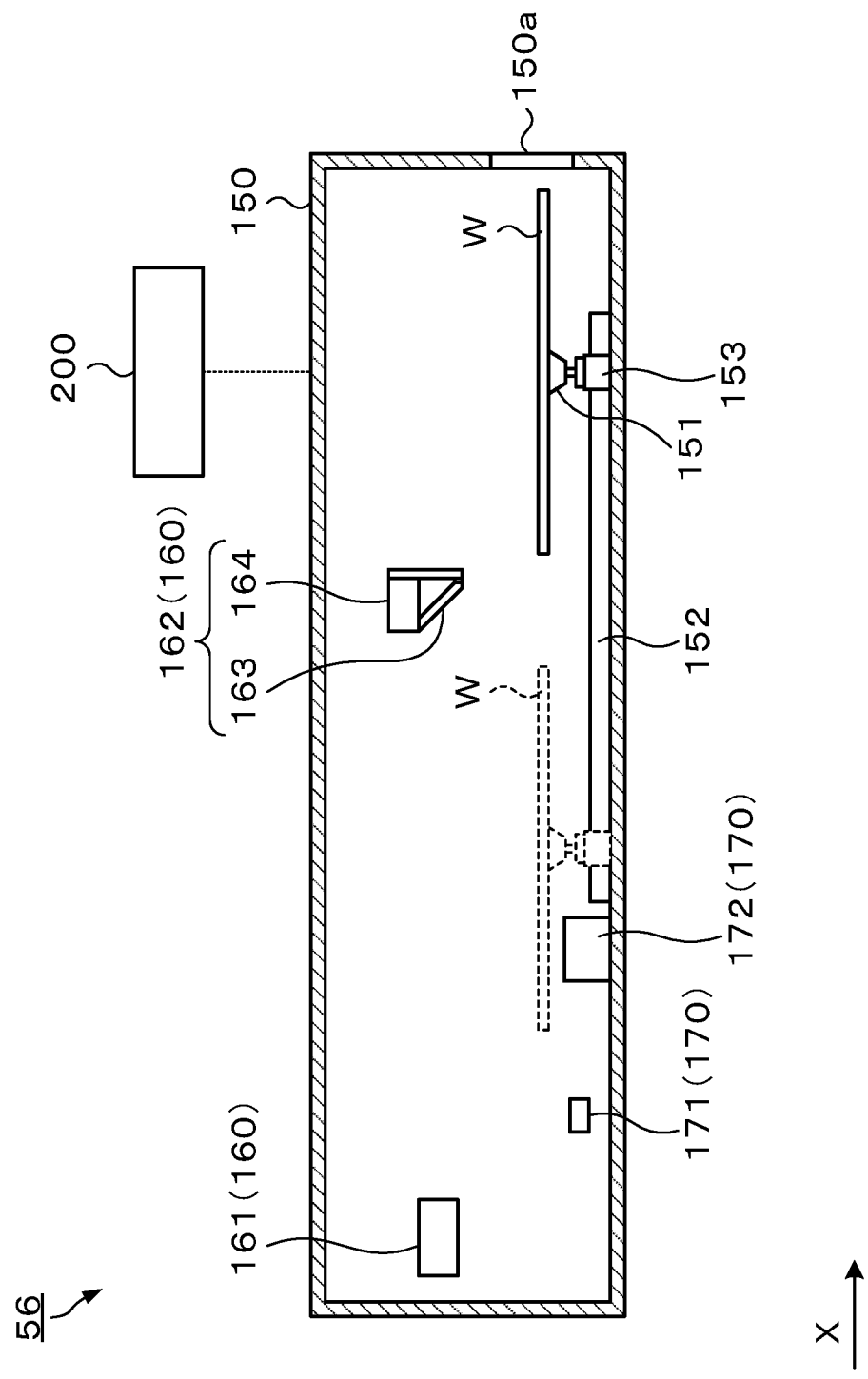
FIG. 5 a longitudinal sectional view illustrating the outline of the configuration of the inspection apparatus.

Next, the configuration of the above inspection apparatus 56 will be explained. FIG. 4 and FIG. 5 are a transverse sectional view and a longitudinal sectional view illustrating the outline of a configuration of the inspection apparatus 56, respectively.

The inspection apparatus 56 has a casing 150 as illustrated in FIG. 4. One side wall of the casing 150 is formed with a transfer-in/out port 150*a* for transferring-in/out the wafer W to/from the casing 150.

Further, in the casing 150, a wafer chuck 151 as a substrate support is provided as illustrated in FIG. 5. The wafer chuck 151 is intended to hold the wafer W. The wafer W is supported on the wafer chuck 151 in such a form that its peripheral edge portion overhangs from the wafer chuck 151.

At the bottom surface of the casing 150, a guide rail 152 is provided which extends from one end side (X-direction positive direction side in FIG. 4) to the other end side (X-direction negative direction side in FIG. 4) in the casing 150. On the guide rail 152, a driver 153 is provided which rotates the wafer chuck 151 and is movable along the guide rail 152. With this configuration, the wafer W held on the wafer chuck 151 is movable between a first position close to the transfer-in/out port 150*a* and a second position close to a later-explained rear surface imaging subunit 170.

In the casing 150, a front surface imaging subunit 160 and the rear surface imaging subunit 170 are further provided.

The front surface imaging subunit 160 has a camera 161 and an illumination module 162.

The camera 161 is provided above the other end side (X-direction negative direction side in FIG. 4) in the casing 150 and has a lens (not illustrated) and an imaging element (not illustrated) such as a CMOS image sensor.

The illumination module 162 is provided at an upper part of the center in the casing 150, and has a half mirror 163 and a light source 164. The half mirror 163 is provided at a position facing the camera 161 in such a state that its mirror surface is inclined upward at 45 degrees toward the camera 161 from a state of being directed vertically downward. The light source 164 is provided above the half mirror 163. The illumination from the light source 164 passes through the half mirror 163 and is applied downward. Further, the light having passed through the half mirror 163 is reflected from an object existing below the half mirror 163, further reflected from the half mirror 163, and captured into the camera 161. In other words, the camera 161 can image the object existing in an irradiation region by the light source 164. Accordingly, when the wafer chuck 151 holding the wafer W moves along the guide rail 152, the camera 161 can image the front surface of the wafer W which passes through the irradiation region of the light source 164. Then, data on the image captured by the camera 161 is inputted into a later-explained controller 200.

The rear surface imaging subunit 170 has a camera 171 and an illumination module 172 as illustrated in FIG. 5.

The camera 171 is provided at a lower part on the other end side (X-direction negative direction side in FIG. 5) in the casing 150 and has a lens (not illustrated) and an imaging element (not illustrated) such as a CMOS image sensor.

The illumination module 172 is arranged at a position below the peripheral edge portion of the wafer W held on the wafer chuck 151, and illuminates the peripheral edge portion of the rear surface of the wafer W overhanging from the wafer chuck 151. The illumination module 172 has, for example, a half mirror (not illustrated) and a light source (not illustrated). The half mirror is provided at a position facing the camera 171 in such a state that its mirror surface is inclined downward at 45 degrees toward the camera 171 from a state of being directed vertically upward. The light source is provided below the half mirror. The illumination from the light source passes through the half mirror and is applied upward. Further, the light having passed through the half mirror is reflected from an object existing above the half mirror, further reflected from the half mirror, and captured into the camera 171. In other words, the camera 171 can image the object existing in an irradiation region by the light source of the illumination module 172. Accordingly, when the wafer W held on the wafer chuck 151 is located at the second position, the camera 171 can image the rear surface of the wafer W, more specifically, the peripheral edge portion of the rear surface of the wafer W. Then, data on the image captured by the camera 171 is inputted into the later-explained controller 200.

In the inspection apparatus 56 configured as above, when the wafer W is located at the second position, the wafer W is imaged by the rear surface imaging subunit 170 as an imager in synchronization with the rotation of the wafer chuck 151 holding the wafer W. Thus, an image obtained by scanning substantially in a circumferential direction can be acquired for the entire surface of the peripheral edge portion of the rear surface of the wafer W.

The above wafer treatment system 1 is provided with the controller 200 as illustrated in FIG. 1. The controller 200 is composed of a computer including, for example, a CPU, a memory, and so on, and has a program storage (not illustrated). The program storage stores programs for controlling the treatments on the wafer W in the wafer treatment system 1 including a program for controlling the inspection of the wafer W performed based on the wafer image as a substrate image captured by the inspection apparatus 56 and a program for estimating the warpage amount of the wafer W performed based on the wafer image captured by the inspection apparatus 56. Note that the above programs may be the ones which are recorded on a computer-readable storage medium and installed from the storage medium H into the controller 200. The storage medium H may be a transitory one or a non-transitory one. Some or all of the programs may be realized by dedicated hardware (circuit board).

Next, the treatments relating to the wafer W performed using the wafer treatment system 1 configured as above will be explained.

First, the cassette C housing a plurality of wafers W is mounted on a predetermined stage plate 21 in the cassette station 10. Then, the wafers W in the cassette C are successively taken out by the wafer transfer apparatus 23 and transferred, for example, to the delivery apparatus 52 in the third block G3 in the treatment station 11.

Next, the wafer W is transferred by the wafer transfer apparatus 70 to the thermal treatment apparatus 40 in the second block G2, and subjected to a temperature regulation treatment. The wafer W is then transferred by the transfer apparatus 70, for example, to the lower anti-reflection film forming apparatus 31 in the first block G1, in which a lower anti-reflection film is formed on the wafer W. The wafer W is then transferred to the delivery apparatus 53 in the third block G3, and transferred by the wafer transfer apparatus 90 to the inspection apparatus 56. The wafer W is transferred, for example, in a predetermined orientation, into the inspection apparatus 56.

In the inspection apparatus 56, imaging by the front surface imaging subunit 160 is performed in synchronization with the movement of the wafer chuck 151 holding the wafer W along the guide rail 152. Along with the above, in the inspection apparatus 56, the wafer W is moved to the above second position, and then imaging by the rear surface imaging subunit 170 is performed in synchronization with the rotation of the wafer chuck 151 holding the wafer W. The imaging result by the front surface imaging subunit 160 is input to the controller 200, and the captured image of the front surface of the wafer W is acquired. Then, the controller 200 performs defect inspection on the front surface of the wafer W based on the captured image of the front surface of the wafer W. Further, the imaging result by the rear surface imaging subunit 170 is input to the controller 200, and the captured image of the rear surface of the wafer W is acquired as will be explained later. Then, the controller 200 performs defect inspection on the rear surface of the wafer W and estimation of the warpage amount of the wafer W based on the captured image of the rear surface of the wafer W. For the defect inspection relating to the front surface and the rear surface of the wafer W based on the captured images of the wafer W, a publicly-known method can be used. Further, the method for estimating the warpage amount of the wafer W based on the captured image of the rear surface of the wafer W will be explained later.

Next, the wafer W is transferred to the delivery apparatus 54. The wafer W is subsequently transferred by the wafer transfer apparatus 70 to the resist coating apparatus 32 in the first block G1. In the resist coating apparatus 32, a resist film is formed on the wafer W and the EBR treatment is performed on the wafer W. The treatment conditions of the EBR treatment are decided, for example, based on the estimation result of the warpage amount of the wafer W.

Next, the wafer W is transferred to the upper anti-reflection film forming apparatus 33 in the first block G1, in which an upper anti-reflection film is formed on the wafer W. The wafer W is then transferred by the wafer transfer apparatus 70 to the delivery apparatus 52, and transferred by the shuttle transfer apparatus 80 to the delivery apparatus 62 in the fourth block G4. The wafer W is then transferred by the wafer transfer apparatus 100 in the interface station 13 to the exposure apparatus 12 and subjected to an exposure treatment in a predetermined pattern. Next, the wafer W is transferred by the wafer transfer apparatus 100 to the delivery apparatus 60 in the fourth block G4. The wafer W is then transferred by the wafer transfer apparatus 70 to the thermal treatment apparatus 40 and subjected to a post-exposure bake treatment. Next, the wafer W is transferred by the wafer transfer apparatus 70 to the developing treatment apparatus 30 and subjected to a developing treatment.

After finish of the developing treatment, the wafer W is transferred to the thermal treatment apparatus 40 and subjected to a post-bake treatment. Next, the wafer W is transferred by the wafer transfer apparatus 70 to the delivery apparatus 50 in the third block G3. The wafer W is then transferred by the wafer transfer apparatus 23 in the cassette station 10 to the cassette C on the predetermined cassette stage plate 21, with which a series of the photography process is completed. This series of photography process is executed also for the subsequent wafers W in the same cassette C.

Figure 6:
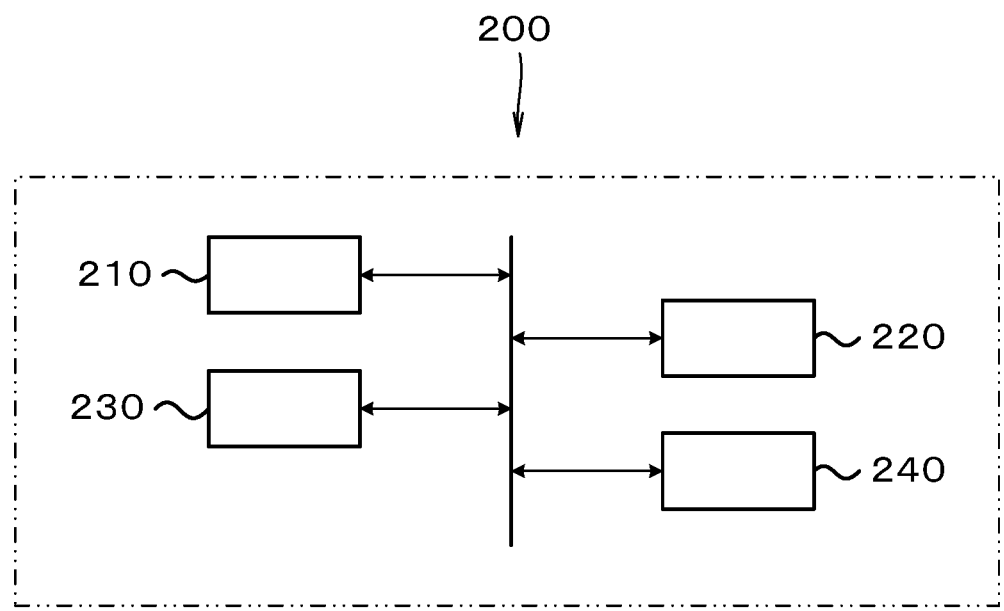
FIG. 6 is a block diagram schematically illustrating the outline of a configuration of a controller.

Subsequently, the configuration of the controller 200 relating to estimation processing of the warpage amount of the wafer will be explained. FIG. 6 is a block diagram schematically illustrating the outline of a configuration of the controller 200.

The controller 200 has a storage 210, an acquirer 220, a calculator 230, and an estimator 240 as illustrated in FIG. 6.

The storage 210 is intended to store various kinds of information. The storage 210 stores later-explained information on a correlation between a rate of change in pixel value relating to a wafer radial direction and the warpage amount of the wafer W in the captured image of the peripheral edge portion of the rear surface of the wafer W, and so on.

The acquirer 220 acquires the captured image of the rear surface of the wafer W based on the imaging result of the wafer W by the rear surface imaging subunit 170. The acquirer 220 concretely performs necessary image processing on the image captured by the rear surface imaging subunit 170, and thereby acquires an image as if the entire surface of the peripheral edge portion of the rear surface of the wafer W is scanned in the circumferential direction.

Figure 7:
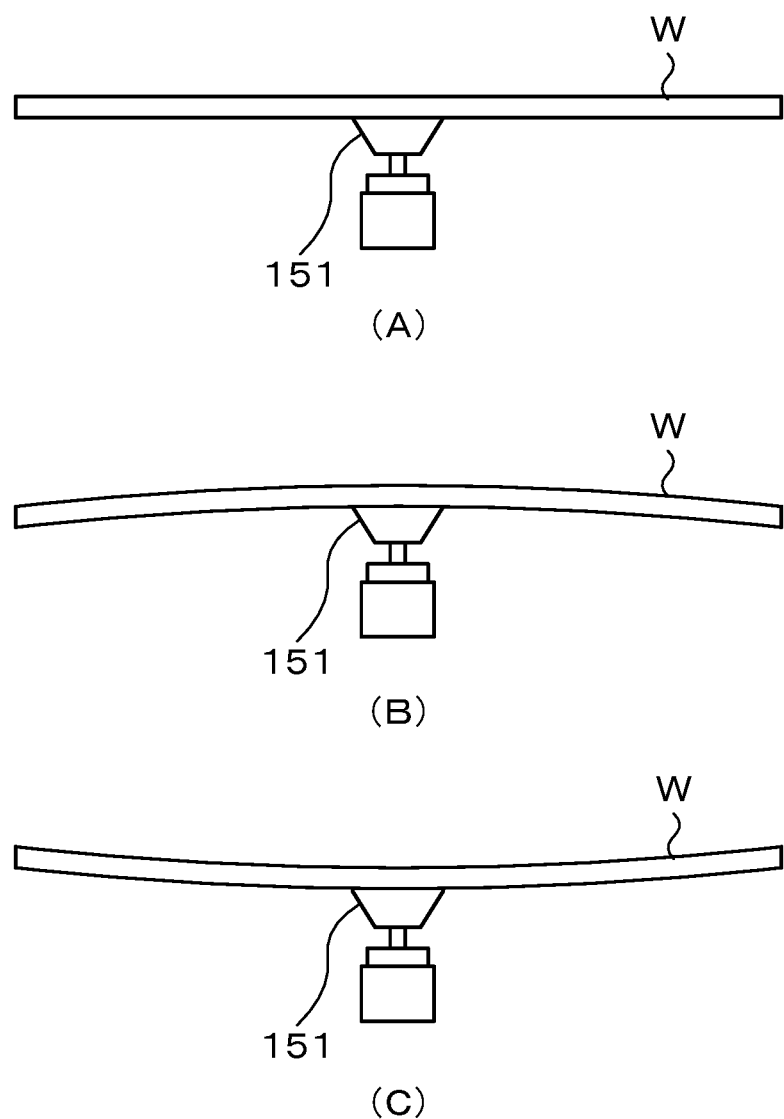
FIG. 7 is a view illustrating a wafer in a state where no warpage occurs and a wafer in a state where warpage occurs.
Figure 8:
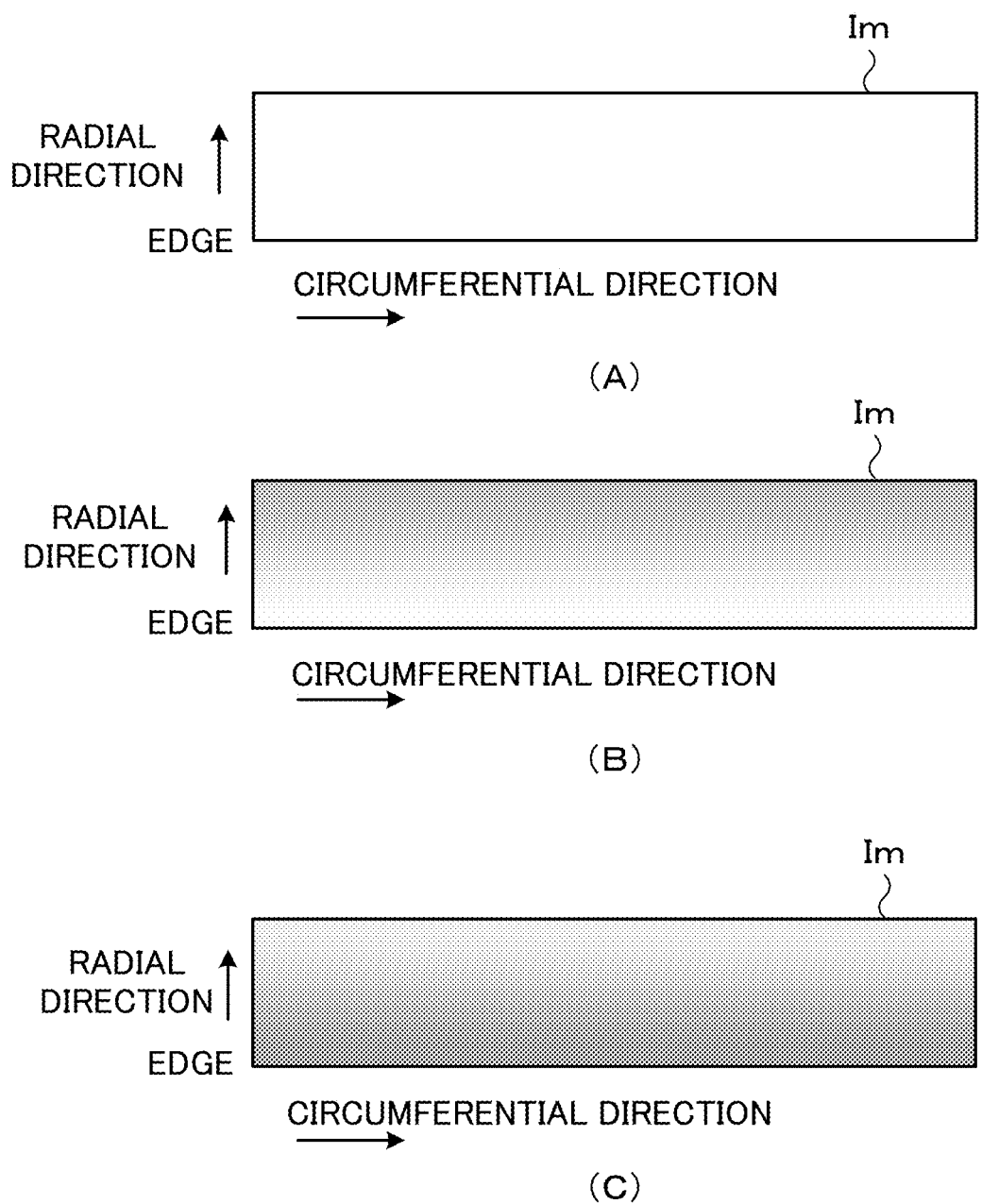
FIG. 8 is a view illustrating an example of a captured image of a peripheral edge portion of a rear surface of the wafer.

Here, a state in which a captured image Im of the rear surface of the wafer W as in FIG. 8(A) is obtained in the case where no warpage occurs on the wafer W as in FIG. 7(A) is considered. More specifically, a state in which an image uniform in pixel value regarding the wafer radial direction (up-down direction in FIG. 8) can be obtained as the captured image Im of the rear surface of the wafer W when the warpage amount of the wafer W is zero is considered.

In this state, in the case where convex warpage (warpage protruding to the wafer front surface side at a middle portion) occurs in the wafer W as illustrated in FIG. 7(B), the pixel value decreases as going to the center side in the wafer radial direction (upper side in FIG. 8) in the captured image Im of the rear surface of the wafer W as illustrated in FIG. 8(B). In other words, the rate of change in pixel value relating to the wafer radial direction in the captured image Im of the rear surface of the wafer W becomes a negative value. This is because the wafer middle portion is farther from the light source, namely, the illumination module 172 than the wafer peripheral edge portion. As the convex warpage becomes larger, the absolute value of the rate of change in pixel value relating to the wafer radial direction increases.

Similarly, in the above state, in the case where concave warpage (warpage protruding to the wafer rear surface side at a middle portion) occurs in the wafer W as illustrated in FIG. 7(C), the pixel value increases as going to the center side in the wafer radial direction (upper side in FIG. 8) in the captured image Im of the rear surface of the wafer W as illustrated in FIG. 8(C). In other words, the rate of change in pixel value relating to the wafer radial direction in the captured image Im of the rear surface of the wafer W becomes a positive value. This is because the wafer middle portion is nearer to the light source, namely, the illumination module 172 than the wafer peripheral edge portion. As the concave warpage becomes larger, the absolute value of the rate of change in pixel value relating to the wafer radial direction increases.

As explained above, it can be considered that there is a correlation between the rate of change in pixel value relating to the wafer radial direction and the warpage amount of the wafer W in the captured image Im of the rear surface of the wafer W. Therefore, it can be considered that grasping the correlation in advance makes it possible that, by acquiring a rate of change in pixel value relating to the wafer radial direction in a captured image of a rear surface for a wafer W being an estimation target for the warpage amount, the warpage amount of the wafer W is estimated from the rate of change and the above correlation.

Hence, the calculator 230 calculates the rate of change in pixel value relating to the wafer radial direction (hereinafter, abbreviated as a "radial direction" in some cases) in the captured image of the rear surface of the wafer W being the estimation target for the warpage amount (hereinafter, abbreviated as an "estimation target wafer W" in some cases). More specifically, the calculator 230 calculates the rate of change in pixel value relating to the radial direction for the captured image of the peripheral edge portion of the rear surface of the estimation target wafer W acquired by the acquirer 220.

The estimator 240 then estimates the warpage amount of the estimation target wafer W based on the correlation obtained in advance between the rate of change in pixel value relating to the wafer radial direction and the warpage amount of the wafer W in the captured image of the rear surface of the wafer W and on a calculation result by the calculator 230.

Figure 9:
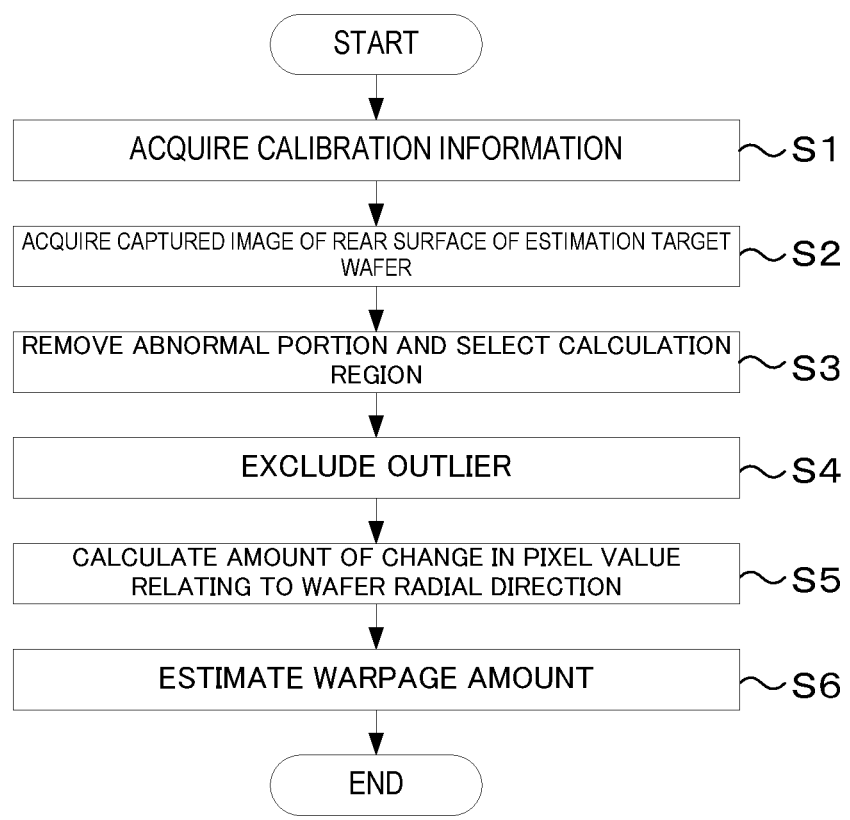
FIG. 9 is a flowchart for explaining an example of a flow of processing by the controller.

Next, processing including the estimation processing of the warpage amount of the wafer W by the controller 200 will be explained. FIG. 9 is a flowchart for explaining an example of a flow of processing by the controller 200.
(1. Acquisition of Calibration Information)

For example, the controller 200 acquires as illustrated in FIG. 8 information necessary for calibrating the captured image of the peripheral edge portion of the rear surface of the wafer W (hereinafter, referred to as "calibration information" in some cases) prior to the estimation of the warpage amount of the wafer W (Step S1). The above calibration is performed so that when the calibration is performed on the captured image of the peripheral edge portion of the rear surface for a calibration wafer W without warpage, the pixel values become constant in the radial direction in the calibrated image. The acquisition of the calibration information is performed, for example, at the startup or maintenance of the wafer treatment system 1. Further, at this step, a bare wafer confirmed to be free from warpage, for example, by an external apparatus (not illustrated) is used as the calibration wafer W. The calibration wafer W is first transferred to the inspection apparatus 56, in which the peripheral edge portion of the rear surface of the calibration wafer W is imaged by the rear surface imaging subunit 170. Then, the acquirer 220 acquires the captured image of the peripheral edge portion of the rear surface of the calibration wafer W based on the imaging result by the rear surface imaging subunit 170, and the controller 200 acquires the calibration information based on the captured image.
(2. Acquisition of the Captured Image of the Rear Surface of the Estimation Target Wafer W)

At the estimation of the warpage amount of the wafer W, first, the acquirer 220 acquires the captured image of the peripheral edge portion of the rear surface of the estimation target wafer W based on the imaging result of the estimation target wafer W by the rear surface imaging subunit 170 in the inspection apparatus 56 (Step S2). In this embodiment, the captured image of the peripheral edge portion of the rear surface of the wafer W is an image obtained by scanning the entire circumference of the peripheral edge portion of the rear surface of the wafer W starting from a predetermined portion (for example, a notch). However, in the case where the rotation mechanism for the wafer W is not installed, the captured image may be an image corresponding to one line of the peripheral edge portion of the rear surface of the wafer W starting from the predetermined portion. Further, the acquirer 220 calibrates the acquired captured image of the peripheral edge portion of the rear surface of the estimation target wafer W based on the above calibration information. Note that the "captured image of the rear surface of the estimation target wafer W" means the "calibrated captured image of the rear surface of the estimation target wafer W", and the "captured image of the peripheral edge portion of the rear surface of the estimation target wafer W" means the calibrated captured image of the peripheral edge portion of the rear surface of the estimation target wafer W unless otherwise stated in the following.

(3. Removal of an Abnormal Portion, and Selection of a Calculation Region)

Then, the calculator 230 removes a portion indicating a pixel value independent of the warpage amount, namely, an abnormal portion from the calibrated captured image of the peripheral edge portion of the rear surface of the estimation target wafer W, and selects a region relating to the wafer circumferential direction to be used for the calculation of the warpage amount in the captured image (Step S3).

Figure 10:
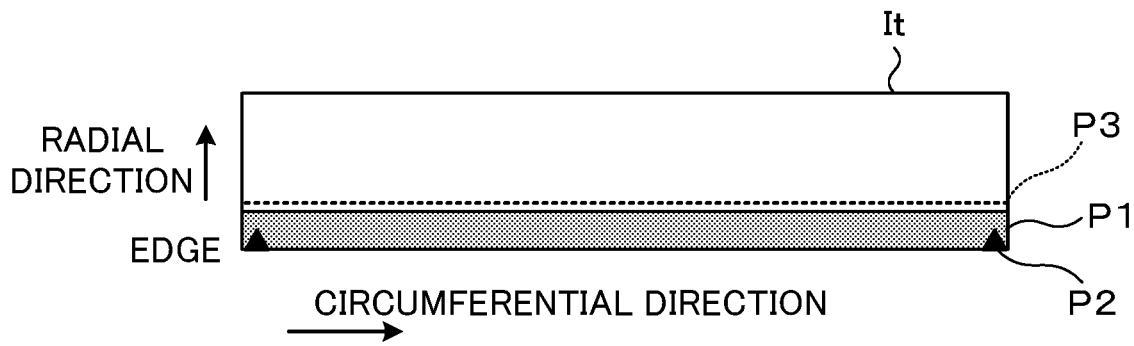
FIG. 10 is a view illustrating an example of an abnormal portion.

The abnormal portion is, for example, predetermined, and is concretely a portion P3 corresponding to a region in a predetermined distance from the outer peripheral end of the wafer W including a portion P1 corresponding to a protective film, a deposition mark or the like and a portion P2 corresponding to a notch in a captured image It of the peripheral edge portion of the rear surface of the estimation target wafer W as illustrated in FIG. 10. Further, a portion corresponding to a region in contact with the transfer arm 70a may be regarded as the abnormal portion. In the case where the abnormal portion is determined in advance, the information regarding the abnormal portion is stored in the storage 210.

Figure 11:
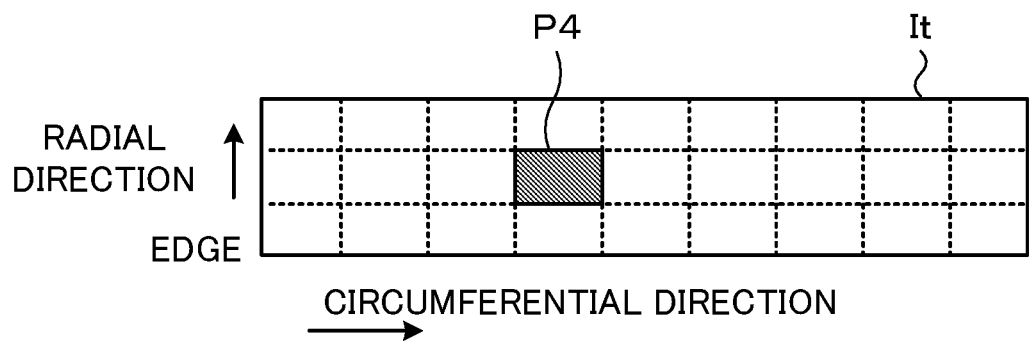
FIG. 11 is a view illustrating another example of the abnormal portion.
Figure 12:
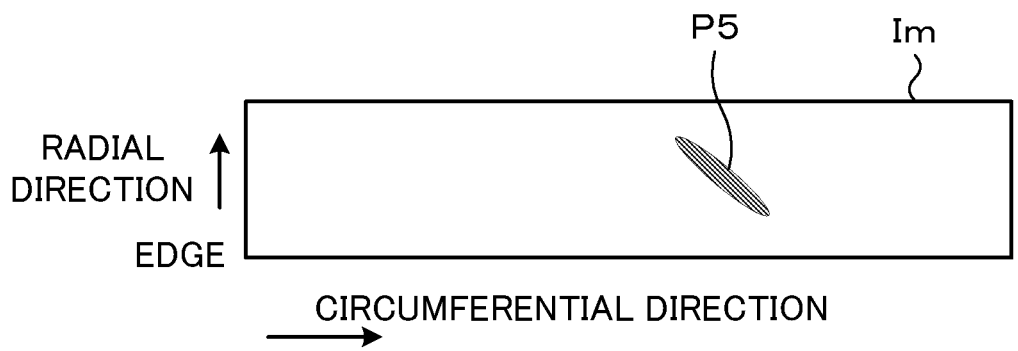
FIG. 12 is a view illustrating another example of the abnormal portion.

The calculator 230 may determine the abnormal portion from the captured image of the peripheral edge portion of the rear surface of the estimation target wafer W. For example, as illustrated in FIG. 11, the captured image It of the peripheral edge portion of the rear surface of the estimation target wafer W is divided into a grid form so that a portion P4 different in average pixel value from the surroundings by more than a threshold value may be regarded as the abnormal portion. Besides, as illustrated in FIG. 12, a portion P5 corresponding to a defect detected in the defect inspection based on the captured image It of the peripheral edge portion of the rear surface of the estimation target may be regarded as the abnormal portion.

Figure 13:
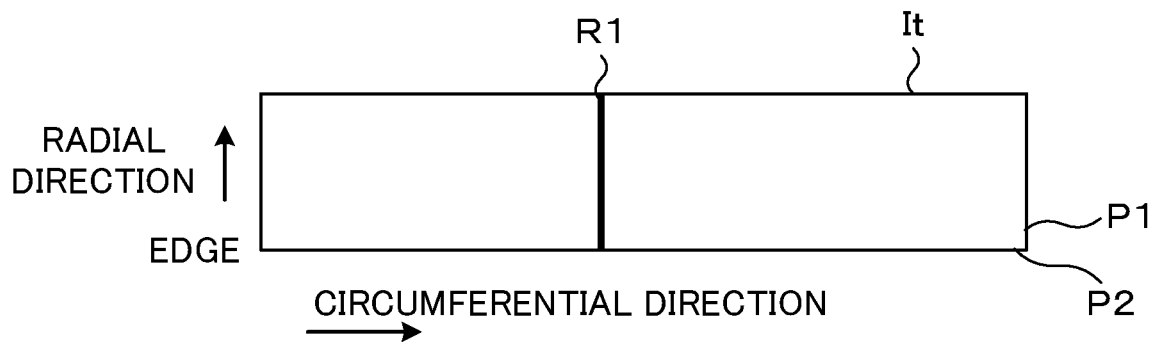
FIG. 13 is a view illustrating an example of a region relating to a wafer circumferential direction used for estimation of the warpage amount in a captured image of the peripheral edge portion of the rear surface of the wafer.
Figure 14:
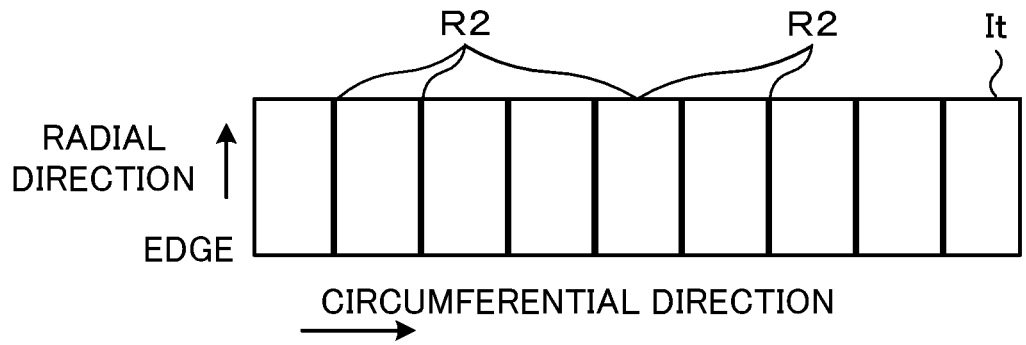
FIG. 14 is a view illustrating another example of the region relating to the wafer circumferential direction used for estimation of the warpage amount in the captured image of the peripheral edge portion of the rear surface of the wafer.

A region relating to the wafer circumferential direction to be used for the calculation of the warpage amount (hereinafter, referred to as a "circumferential region" in some cases) is, for example, a linear region R1 corresponding to a prespecified angle of the captured image It of the peripheral edge portion of the rear surface of the estimation target wafer W as illustrated in FIG. 13. Further, the circumferential region to be used for the calculation of the warpage amount may be a plurality of linear regions R2 corresponding to a plurality of prespecified angles as illustrated in FIG. 14.

Figure 15:
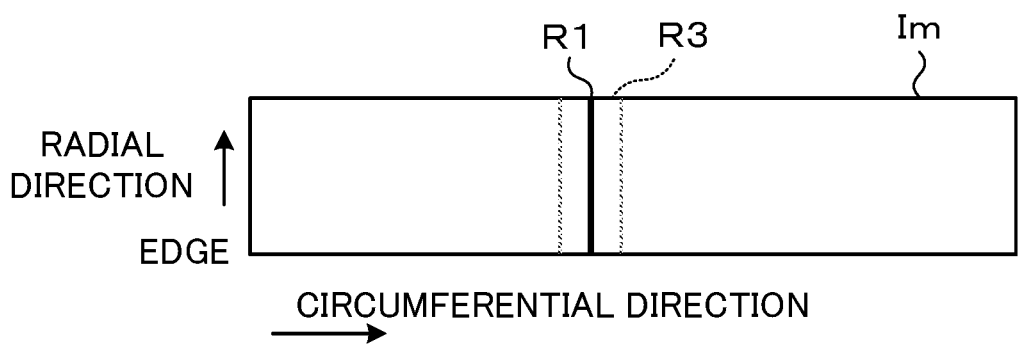
FIG. 15 is a view for explaining an example of a pixel value used for estimation or the like of the warpage amount.

Note that in the subsequent processing, the pixel values in the linear region R1 in the captured image It of the peripheral edge portion of the rear surface of the estimation target wafer W are used. As the pixel values in the linear region R1, for example, a pixel value averaged in the wafer circumferential direction in a band region R3 including the linear region R1 and wider in the wafer circumferential direction than the linear region R1 as illustrated in FIG. 15.

(4. Exclusion of an Outlier)

Next, the calculator 230 excludes an outlier from the pixel values included in the captured image of the peripheral edge portion of the rear surface of the estimation target wafer W (Step S4). More specifically, the calculator 230 excludes an outlier from the pixel values in the linear region R1 selected at Step S3 in the captured image of the peripheral edge portion of the rear surface of the estimation target wafer W from which the above abnormal portion has been removed. The outlier is, for example, a value whose absolute value of a difference from the average pixel value in the linear region R1 exceeds a threshold value (for example, $3\sigma$ ($\sigma$ is a standard deviation of the pixel value)).

(5. Calculation of the Rate of Change in Pixel Value Relating to the Wafer Radial Direction)

Subsequently, the calculator 230 calculates the rate of change relating to the radial direction in pixel value in the captured image of the peripheral edge portion of the rear surface of the estimation target wafer W (Step S5). More specifically, the calculator 230 calculates the rate of change (for example, an average rate of change) relating to the radial direction in pixel value in the linear region R1 selected at Step S3 included in the captured image of the peripheral edge portion of the rear surface of the estimation target wafer W from which the abnormal portion has been removed. In this calculation, the pixel value excluded at Step S4 is not taken into consideration.

(6. Estimation of the Warpage Amount)

Then, the estimator 240 estimates the warpage amount of the estimation target wafer W based on the calibration curve indicating the correlation obtained in advance between the rate of change in pixel value relating to the wafer radial direction in the captured image of the rear surface of the wafer W and the warpage amount of the wafer W, and on the rate of change in pixel value relating to the radial direction calculated at the above 5. calculation step (Step S6).

The calibration curve can be expressed by the following Expression (1).

$$T = a \cdot x + b \tag{1}$$

T: the estimated value of the warpage amount of the estimation target wafer W x: the rate of change in pixel value relating to the radial direction in the captured image of the peripheral edge portion of the rear surface of the estimation target wafer W a, b: constant Besides, as the calibration curve, different ones may be used according to the diameter of the wafer chuck 151.

Note that the above Steps S1 to S6 may be performed for each of a plurality of colors, for example, R (red), G (green), B (blue), and gray. In this case, for example, the average value of the estimated value of the warpage amount of the estimation target wafer W obtained for each of the plurality of colors may be regarded as the warpage amount of the estimation target wafer W.

The above Steps S1 to S6 may be performed only for a specific color (hereinafter, referred to as an "estimation target color") of the plurality of colors. The estimation target color is decided in advance. For example, for each of the plurality of colors, the warpage amounts of a plurality of reference wafers W whose warpage amounts have been already known are estimated based on the captured images of the rear surfaces as in the above manner, and the color for which the estimated value close to the actual warpage amount is obtained may be regarded as the estimation target color.

Further, in this case, from an estimated warpage amount based on the captured image of the rear surface of the reference wafer W whose warpage amount has been already known and the actual warpage amount regarding the estimation target color, information regarding correction (for example, a correction formula) may be decided in advance. Then, based on the information regarding the correction, the estimated value of the warpage amount of the estimation target wafer W may be corrected. More specifically, from the estimated warpage amount based on the captured image of the rear surface of the reference wafer W whose warpage amount has been already known and the actual warpage amount regarding the estimation target color, for example, a correction formula expressed by the following Expression (2) is decided in advance.

$$Ta = c \cdot T + d \quad (2)$$

T: the estimated value of the warpage amount of the estimation target wafer W

Ta: the corrected estimated value of the warpage amount of the estimation target wafer W c, d: constant Then, based on the correction formula of Expression (2), the estimated value of the warpage amount of the estimation target wafer W may be corrected.

Further, the method of deciding the estimation target color may be a follows. The deciding method uses, for example, not only the rear surface imaging subunit 170 but also a peripheral edge imaging subunit which images the peripheral end surface of the wafer W. In this deciding method, both following (X) and (Y) are performed at each of a plurality of circumferential positions different from each other of the common reference wafer W.

Figure 16:
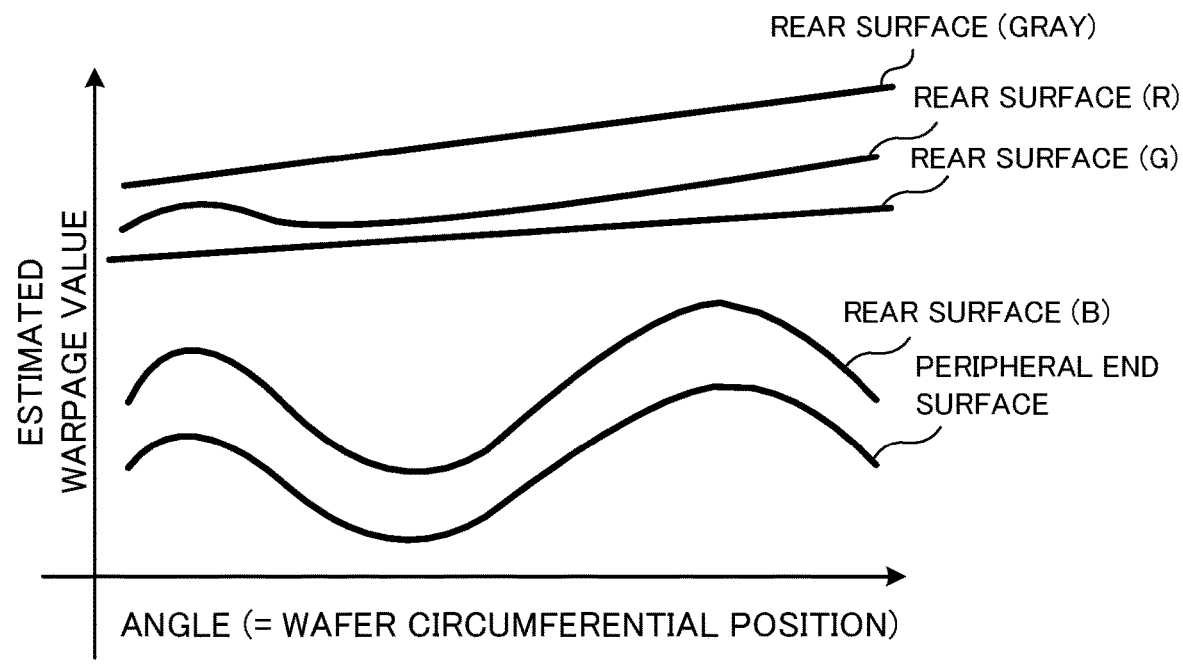
FIG. 16 is a chart illustrating an estimated result of the warpage amount for each estimation method.

(X) estimation of the warpage amount of the reference wafer W based on the captured image of the rear surface of the wafer W for each of the plurality of colors (Y) estimation of the warpage amount of the reference wafer W based on the captured image of the peripheral end surface of the wafer W This reveals the tendency relating to the wafer circumferential direction of the estimated warpage amount of the reference wafer W in both of the case of the estimation based on the rear surface image and the case of the estimation based on the peripheral end surface image and, in the former case, reveals the tendency for each of the plurality of colors. The estimation target color is the one whose tendency in the estimated warpage amount based on the rear surface image is close to the tendency in the estimated warpage amount based on the peripheral end surface image. More specifically, in the example in FIG. 16, the one of the estimated warpage amounts based on the rear surface image regarding R, G, B, and gray, that is close in the tendency to the tendency of the estimated warpage amount based on the peripheral end surface image is the one regarding B. In this case, the estimation target color is decided to be B.

The peripheral edge imaging subunit may be provided in the same inspection apparatus, namely, the same casing as that of the rear surface imaging subunit 170, or may be provided in an inspection apparatus other than that of the rear surface imaging subunit 170. In the case where the peripheral edge imaging subunit is provided in the other inspection apparatus, the other inspection apparatus may be provided in a semiconductor manufacturing apparatus different from the wafer treatment system.

Figure 17:
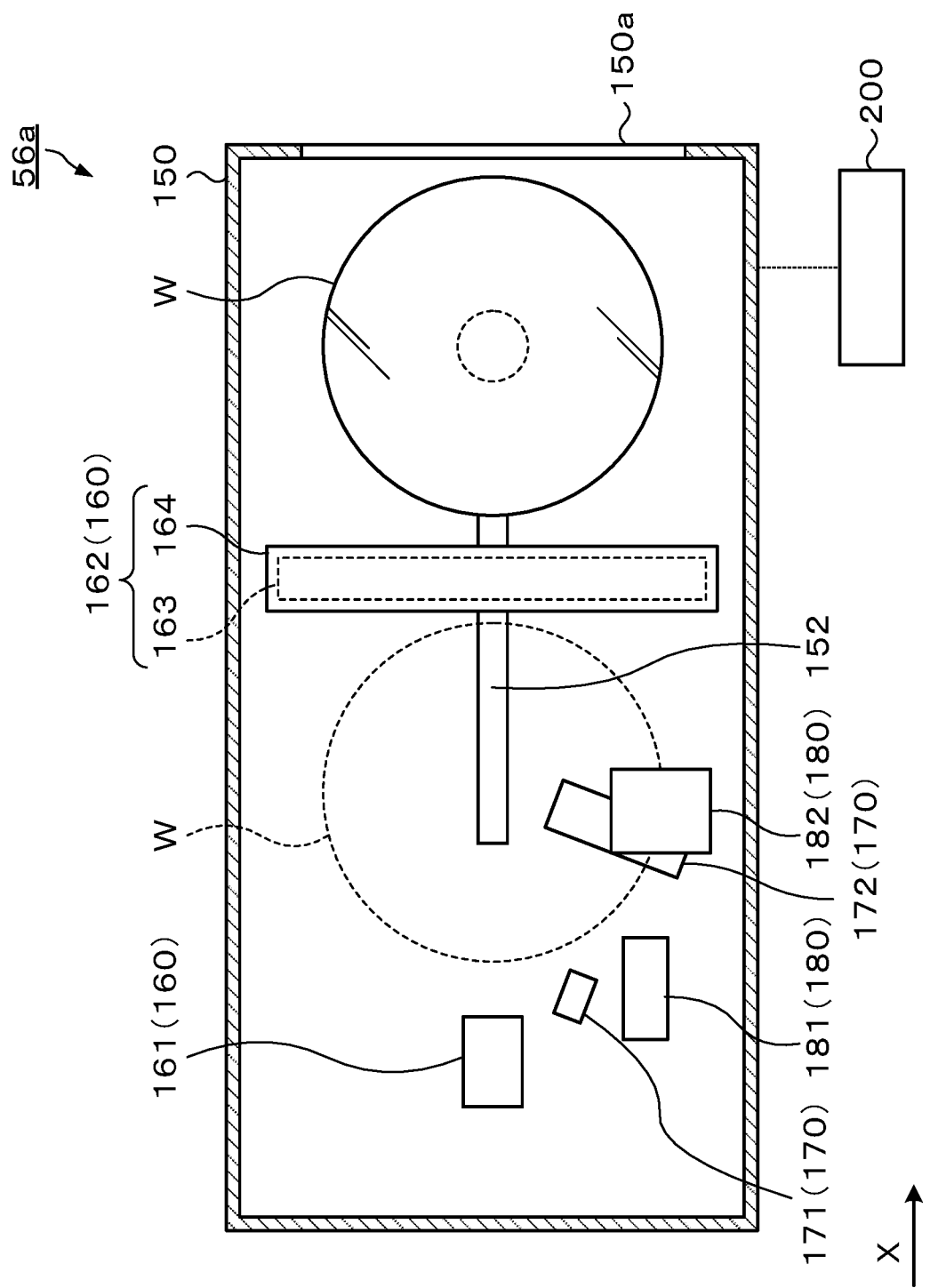
FIG. 17 is a transverse sectional view illustrating the outline of a configuration of an inspection apparatus according to another example.
Figure 18:
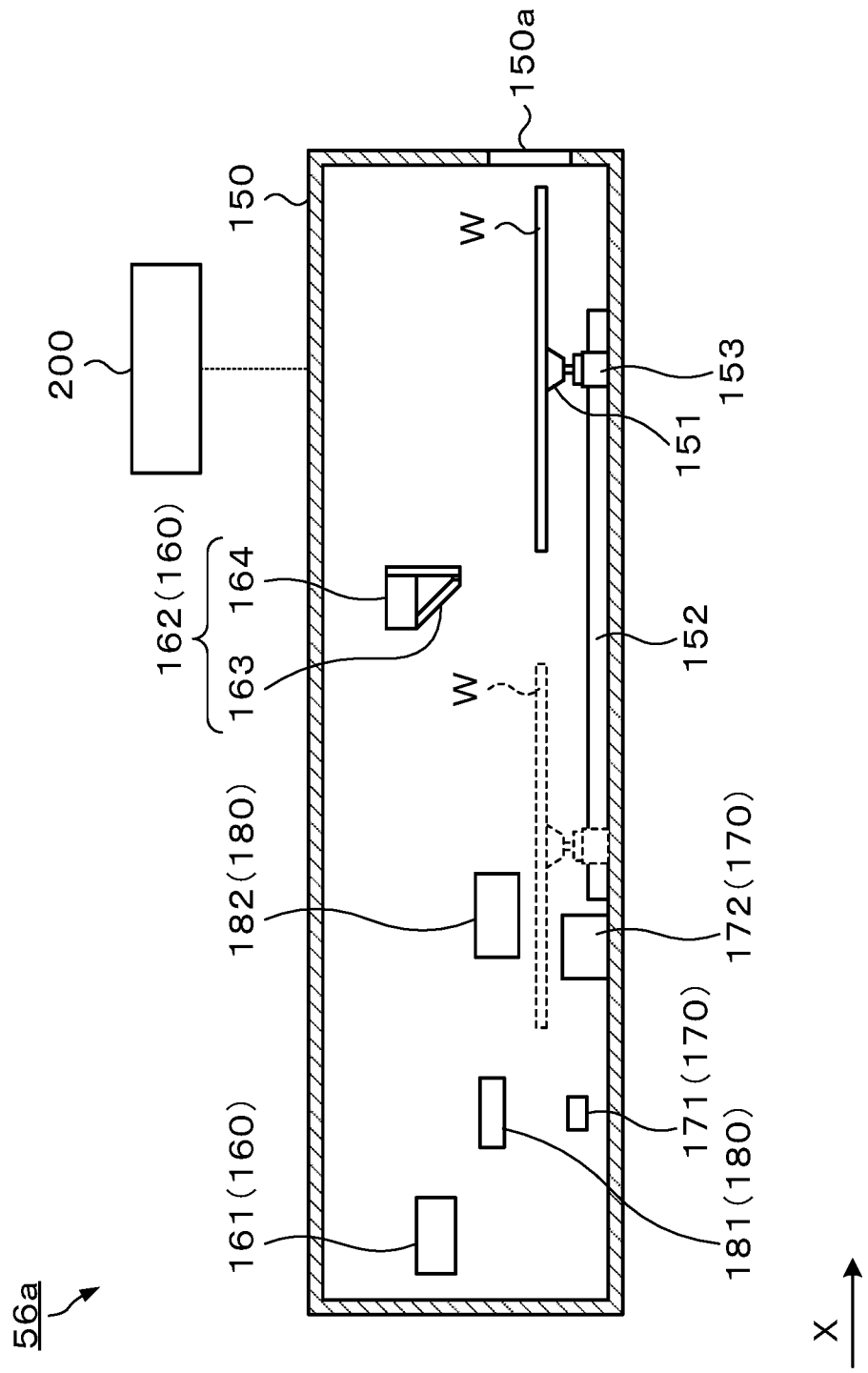
FIG. 18 is a longitudinal sectional view illustrating the outline of the configuration of the inspection apparatus according to the another example.
Figure 19:
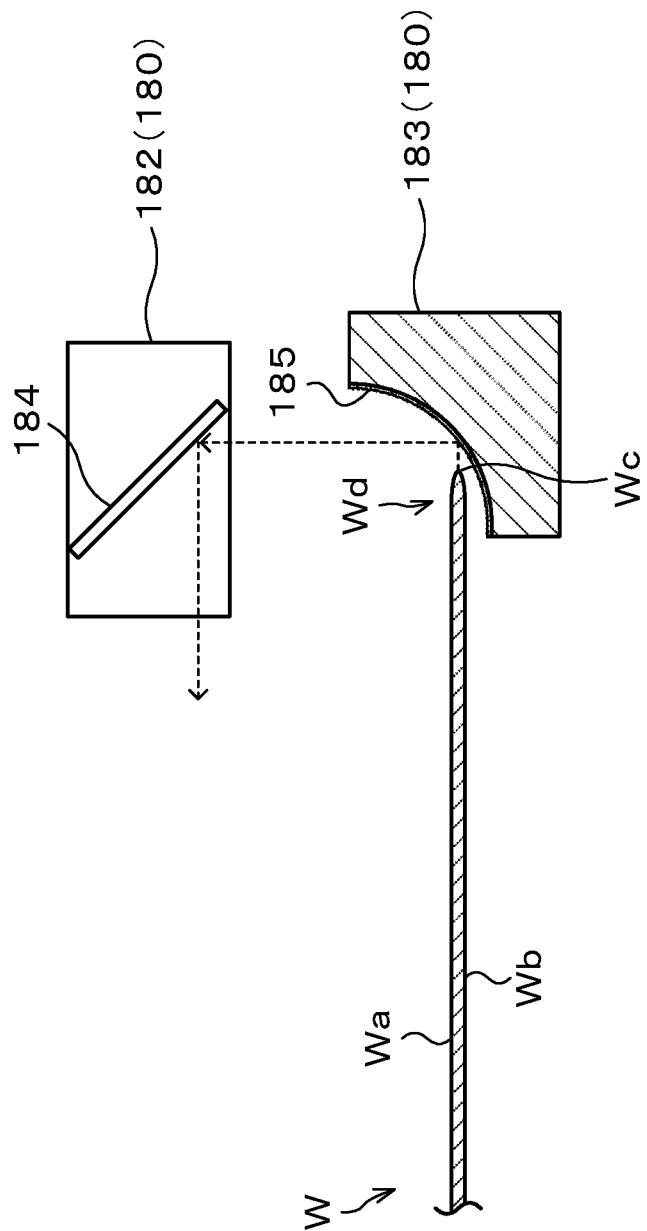
FIG. 19 is an explanatory view of a configuration example of a peripheral edge imaging subunit.

FIG. 17 and FIG. 18 are a transverse sectional view and a longitudinal sectional view illustrating the outline of a configuration of an inspection apparatus in which the rear surface imaging subunit and the peripheral edge imaging subunit are provided in the same casing. FIG. 19 is a view illustrating a configuration example of the peripheral edge imaging subunit.

An inspection apparatus 56a in FIG. 17 and FIG. 18 has a peripheral edge imaging subunit 180 in addition to the rear surface imaging subunit 170 in the casing 150.

The peripheral edge imaging subunit 180 includes a camera 181, an illumination module 182, and a mirror member 183 as illustrated in FIG. 17 to FIG. 19.

The camera 181 has a lens (not illustrated) and an imaging element (not illustrated) such as a CMOS image sensor.

As illustrated in FIG. 19, the illumination module 182 is provided above the wafer W held on the wafer chuck 151, and has a light source (not illustrated), a half mirror 184 and so on. The light source is provided above the half mirror 184. The half mirror 184 is provided at a position facing the camera 181 in such a state that its mirror surface is inclined upward at 45 degrees toward the camera 181 from a state of being directed vertically downward.

The mirror member 183 is provided below the illumination module 182. A reflection surface 185 of the mirror member 183 faces a peripheral end surface (namely, side end surface) Wc of the wafer W held on the wafer chuck 151 when the wafer W held on the wafer chuck 151 is located at the second position.

In the illumination module 182, light emitted from the light source passes through the half mirror 184 and is applied downward. Diffused light having passed through the half mirror 184 is reflected from a peripheral edge region Wd of a front surface Wa of the wafer W located below the half mirror 184 or from a reflection surface 185 of the mirror member 183 when the wafer W held on the wafer chuck 151 is located at the second position. Note that reflected light reflected from the reflection surface 185 is applied mainly to the peripheral end surface Wc of the wafer W.

The reflected light reflected from the peripheral end surface Wc of the wafer W is reflected sequentially from the reflection surface 185 of the mirror member 183 and the half mirror 184 of the illumination module 182, and enters the camera 181 (see arrows in FIG. 19). Thus, the camera 181 can image the peripheral end surface Wc of the wafer W. Data on an image captured by the camera 181 is input into the controller 200.

In the controller 200, for example, in addition to the estimation of the warpage amount of the wafer W based on the captured image of a rear surface Wb of the estimation target wafer W, estimation of the warpage amount of the wafer W based on the captured image of the peripheral end surface Wc of the estimation target wafer W is also performed as follows. The controller 200 acquires shape data on the peripheral end surface of the reference wafer W from the captured image of the peripheral end surface Wc of the reference wafer W, and further acquires shape data on the peripheral end surface Wc of the estimation target wafer W from the captured image of the peripheral end surface Wc of the estimation target wafer W. The controller 200 then calculates (estimates) the warpage amount of the estimation target wafer W from the shape data on the peripheral end surface Wc of the reference wafer W and the shape data on the peripheral end surface Wc of the estimation target wafer W.

In the case of using the inspection apparatus 56a, the following (A) and (B) may be performed at each of a plurality of circumferential positions different from each other of the estimation target wafer W.

(A) Estimation of the warpage amount of the estimation target wafer W based on the captured image of the rear surface of the estimation target wafer W for each of the plurality of colors (B) Estimation of the warpage amount of the estimation target wafer W based on the captured image of the peripheral end surface of the estimation target wafer W This reveals the tendency relating to the wafer circumferential direction of the estimation result of the warpage amount of the estimation target wafer W in both of the case of the estimation based on the rear surface image and the case of the estimation based on the peripheral end surface image and, in the former case, reveals the tendency for each of the plurality of colors. The controller 200 selects, for example, the estimated warpage amount regarding the color that is close in the tendency to the estimated warpage amount based on the peripheral end surface image from among the estimated warpage amounts based on the rear surface image respectively acquired for the plurality of colors, as an optimal estimated value and outputs it. More specifically, in the example in FIG. 16, the one of the estimated warpage amounts based on the rear surface image regarding R, G, B, and gray, that is close in the tendency to the estimated warpage amount based on the peripheral end surface image is the one regarding B. In this case, the controller 200 selects and outputs the estimated warpage amount based on the rear surface image regarding B.

Further, by performing both the above (A) and (B) and then, when one of the estimations is failed, selecting a result of the other, it is possible to calculate the estimation result at all time. This is because, for example, when the warpage amount is large, it is assumed that the wafer may be located outside an image area and the estimation cannot be performed in the above (B).

Further, the above estimation target color and the information regarding the correction may be decided in advance for each kind of film formed on the front surface of the estimation target wafer W, or for each apparatus used for the treatment on the estimation target wafer W. Then, in the estimation of the warpage amount, the estimation target color or the information regarding correction according to the kind of film or the apparatus may be used. Note that in the case where a plurality of films are layered on the front surface of the estimation target wafer W, "for each kind of film" means, for example, "for each kind of film at the outermost layer", "for each combination of films" or the like. Further, in the case where a plurality of apparatuses are used for the treatment on the estimation target wafer W, "for each apparatus" means, for example, "for each apparatus used for a film forming treatment immediately before imaging the rear surface", "for each combination of apparatuses" or the like.

As explained above, in this embodiment, the estimation of the warpage amount of the estimation target wafer W is performed based on the correlation obtained in advance between the rate of change relating to the radial direction in pixel value in the captured image of the rear surface of the wafer W and the warpage amount of the wafer W and on the rate of change relating to the radial direction in pixel value in the captured image of the rear surface of the estimation target wafer W. This estimation method can perform estimation irrespective of the magnitude of the warpage. Further, the estimation method does not require a mechanism which moves the rear surface imaging subunit 170 used for estimation according to the warpage amount even when the warpage is large, for example, 1 mm or more. Therefore, according to this embodiment, it is possible to estimate the warpage amount of the wafer without increasing the size of the apparatus even when the warpage of the substrate is large.

For the estimation of the warpage amount of the wafer W, the abnormal portion may be removed from the captured image of the rear surface of the wafer W as explained above. By removing the abnormal portion as above, the warpage amount of the wafer W can be more accurately estimated.

Besides, one or a plurality of regions relating to the wafer circumferential direction may be used for the calculation of the warpage amount in the captured image of the rear surface of the wafer W as explained above. In the case of one region, it is possible to perform the estimation processing for the warpage amount at high speed. Besides, in the case of the plurality of regions, it is possible to grasp the shape of the whole wafer and, for example, to grasp the occurrence of warpage in a saddle shape. Note that in the case of the plurality of regions, an average value of a plurality of estimated amounts of warpages may be regarded as the warpage amount of the estimation target wafer W.

Besides, as explained above, the estimation target color may be decided in advance for each kind of film formed on the front surface of the estimation target wafer W or for each apparatus used for the treatment on the estimation target wafer W, and the estimation target color according to the kind of film or the apparatus may be used when estimating the warpage amount. This makes it possible to accurately estimate the warpage amount of the wafer W irrespective of the kind of film or the apparatus.

Further, as explained above, the information regarding the correction may be decided in advance for each kind of film formed on the front surface of the estimation target wafer W or for each apparatus used for the treatment on the estimation target wafer W, and the information regarding the correction according to the kind of film or the apparatus may be used when estimating the warpage amount. This makes it possible to more accurately estimate the warpage amount of the wafer W irrespective of the kind of film or the apparatus.

Besides, as explained above, a correlation formula according to the diameter of the wafer chuck 151 may be used. This makes it possible to accurately estimate the warpage amount of the wafer W irrespective of the diameter of the wafer chuck 151. Note that the correction may be performed by performing estimation using a common correlation formula irrespective of the diameter of the wafer chuck 151 and then using a correction formula similar to the above Expression (2) obtained in advance for each diameter of the wafer chuck 151.

Note that the captured image of the front surface may be used in place of the captured image of the rear surface to estimate the warpage amount as in the above manner.

(Verification Test 1)

In Verification Test 1, a bare wafer without warpage, a wafer with a warpage amount of −1000 μm, a wafer with a warpage amount of −750 μm, a wafer with a warpage amount of 750 μm, and a wafer with a warpage amount of 1000 μm were prepared, and the captured image of the peripheral edge portion of the rear surface (more specifically, the captured image of the peripheral edge portion of the rear surface after the above calibration was performed) was acquired for each of the wafers. Then, the rate of change in pixel value of R relating to the wafer radial direction in the captured image of the peripheral edge portion of the rear surface was calculated for each of the wafers. Note that a wafer whose warpage amount indicates a negative value is a convex warped wafer.

Figure 20:
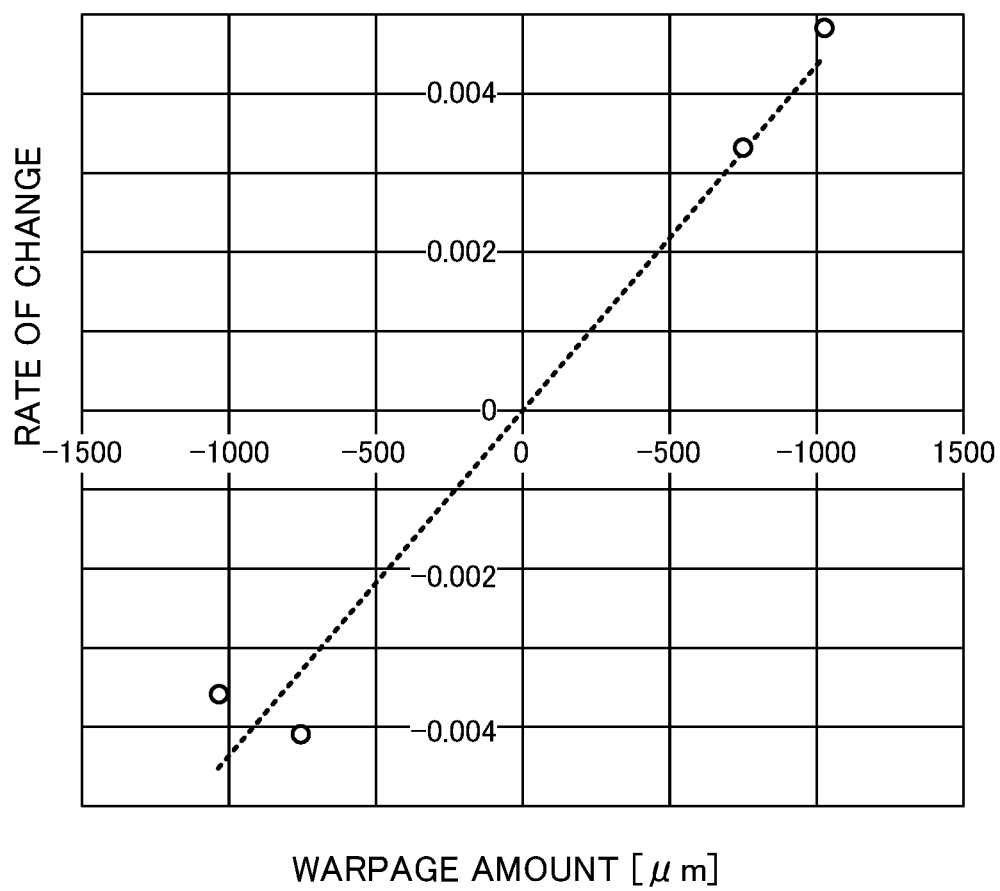
FIG. 20 is a chart illustrating a result of Verification Test 1.

FIG. 20 is a chart illustrating the relation between the warpage amount of the wafer W and the rate of change in pixel value of R relating to the wafer radial direction in the captured image of the peripheral edge portion of the rear surface of the wafer W. In FIG. 20, the horizontal axis indicates the warpage amount, and the vertical axis indicates the rate of change.

As illustrating in the chart, in Verification Test 1, the rate of change tended to increase as the warpage amount increased. Accordingly, by creating the calibration curve indicating the correlation between the warpage amount of the wafer W and the rate of change based on the result of Verification Test 1 in advance, the warpage amount of the estimation target wafer W can be estimated based on the calibration curve and on the rate of change regarding the estimation target wafer W.

(Verification Test 2)

In Verification Test 2, a bare wafer without warpage, a wafer with a warpage amount of −1000 μm, and a wafer with a warpage amount of 1000 μm were prepared, and four wafer chucks 151 (chucks A to D) different in diameter from one another were prepared. Note that the sizes of the chuck diameters are set such that the chuck A<the chuck B<the chuck C<the chuck D. Then, regarding each of the wafers, the captured image of the peripheral edge portion of the rear surface was acquired and the rate of change in pixel value of R relating to the wafer radial direction in the captured image of the peripheral edge portion of the rear surface was calculated, for each wafer chuck 151.

Figure 21:
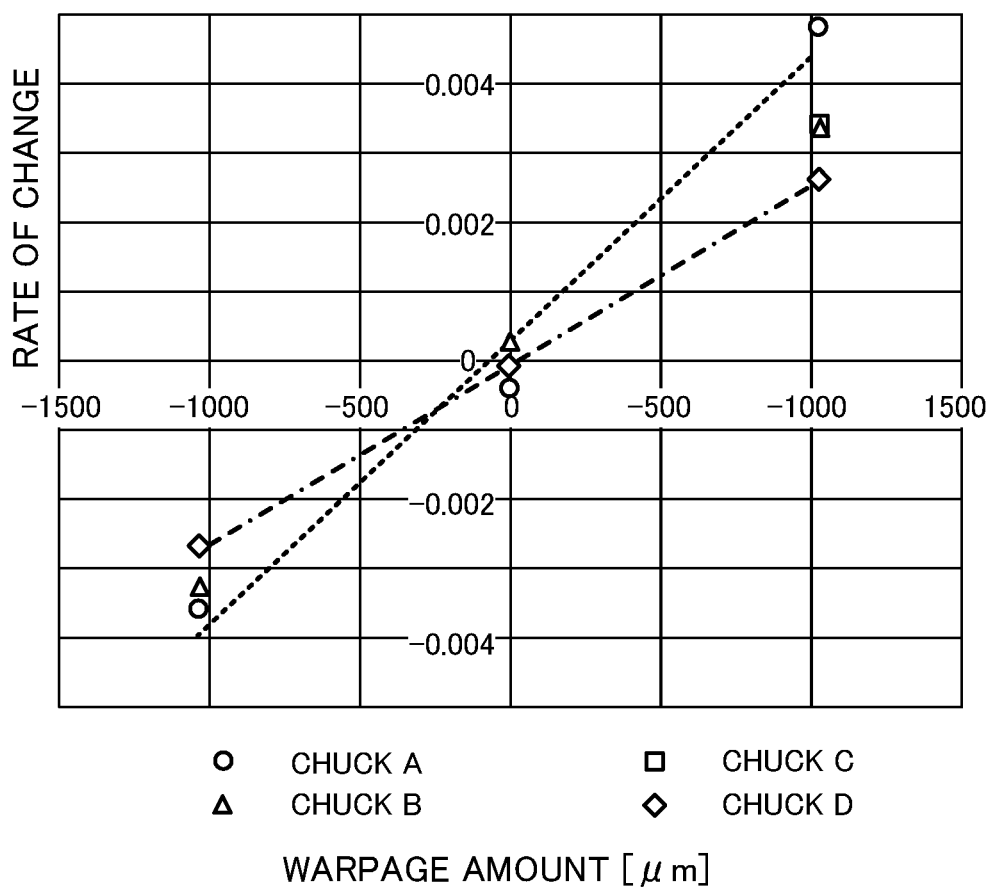
FIG. 21 is a chart illustrating a result of Verification Test 2.

FIG. 21 is a chart illustrating the result of Verification Test 2, and illustrates the relation between the warpage amount of the wafer W and the rate of change in pixel value of R relating to the wafer radial direction in the captured image of the peripheral edge portion of the rear surface of the wafer W, for each chuck diameter. In the chart, the horizontal axis indicates the warpage amount, and the vertical axis indicates the rate of change.

As illustrating in the chart, in Verification Test 2, the rate of change tended to increase as the warpage amount increased even with any chuck diameter. However, the correlation was different for each chuck diameter and, more specifically, the fluctuation in the rate of change to the fluctuation in the warpage amount was larger for a smaller chuck diameter.

The above result reveals the following. Specifically, it is revealed that by individually acquiring the correlation for each chuck diameter in advance and performing the estimation of the warpage amount of the wafer W based on the correlation corresponding to the chuck diameter of the wafer chuck 151 holding the estimation target wafer W at the estimation, the accurate estimation is possible irrespective of the chuck diameter. Further, it is revealed that also by estimating the warpage amount of the wafer W using the common correlation formula irrespective of the diameter of the wafer chuck 151 and then correcting it using the correction formula obtained in advance for each diameter of the wafer chuck 151, the accurate estimation is possible irrespective of the chuck diameter.

Figure 22:
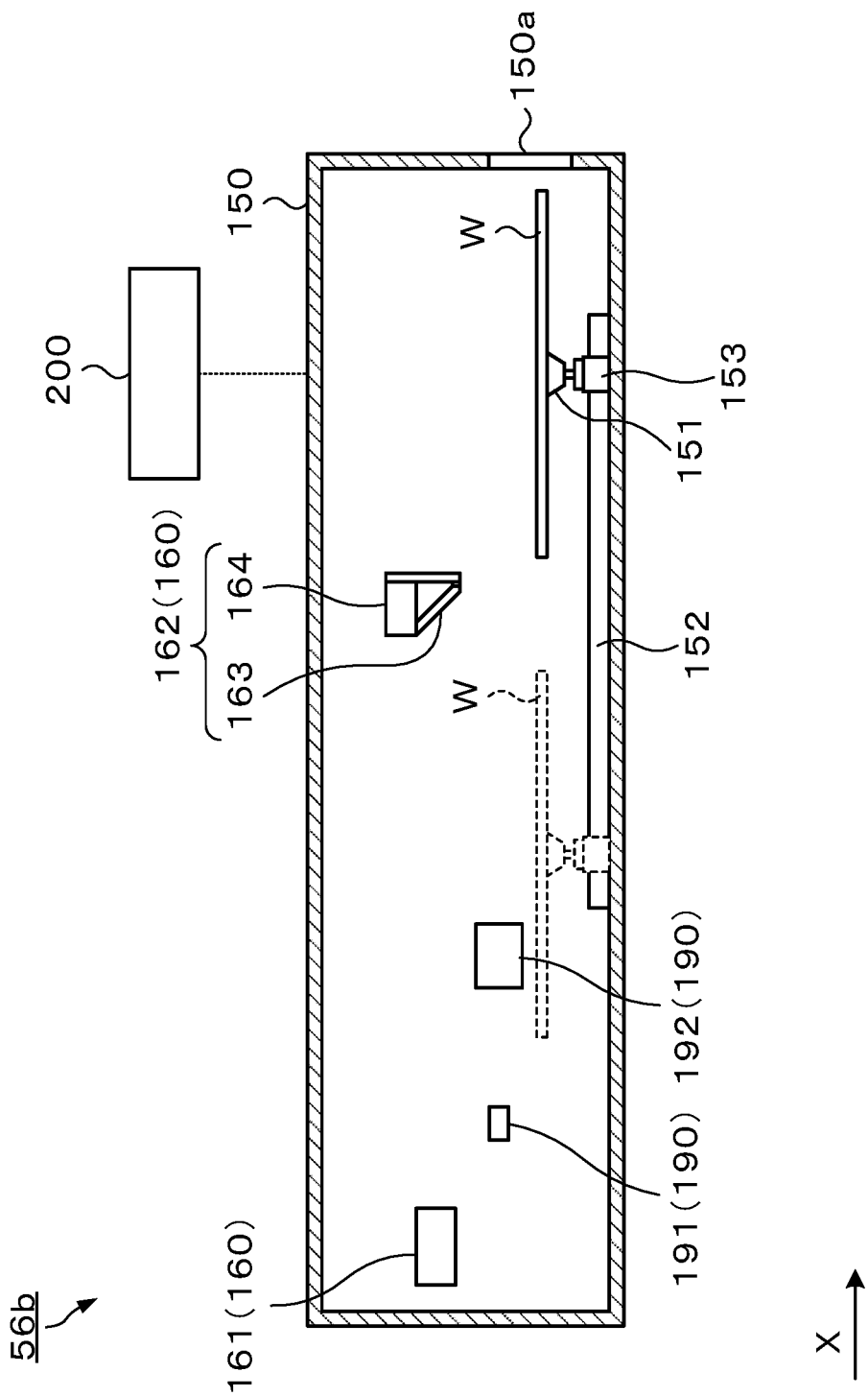
FIG. 22 is a longitudinal sectional view illustrating the outline of a configuration of an inspection apparatus according to another example.

FIG. 22 is a longitudinal sectional view illustrating the outline of an inspection apparatus according to another example.

In the above example, the warpage amount of the estimation target wafer W is estimated based on the captured image of the rear surface of the estimation target wafer W. In place of the above, the warpage amount of the estimation target wafer W may be estimated based on the captured image of the front surface of the estimation target wafer W.

In this case, for example, as illustrated in FIG. 22, a front surface imaging subunit 190 is provided in place of the rear surface imaging subunit 170 (see FIG. 4) in the casing 150 of the inspection apparatus 56a. The front surface imaging subunit 190 images the front surface of the wafer, more specifically, the peripheral edge portion of the front surface of the wafer W. The front surface imaging subunit 190 has a camera 191 and an illumination module 192.

The illumination module 192 is arranged at a position above the vicinity of the peripheral edge portion of the wafer W held on the wafer chuck 151, and the camera 191 is provided at almost the same height as that of the illumination module 162 in the casing 150. The camera 191 and the illumination module 192 are the same in function and operation as the camera 171 and the illumination module 172 of the rear surface imaging subunit 170 though they are different in arrangement position in the casing and imaging target portion.

Further, the estimation of the warpage amount of the estimation target wafer W based on the captured image of the front surface of the estimation target wafer W is the same in operation required for acquisition of the captured image, arithmetic processing of calculating the warpage amount based on the captured image, and so on as the estimation of the warpage amount of the estimation target wafer W based on the captured image of the rear surface of the estimation target wafer W though the captured image to be used for the estimation is different.

Note that in the case of estimating the warpage amount of the estimation target wafer W based on the captured image of the front surface of the estimation target wafer W, the front surface imaging subunit 190 is not provided, but the captured image of the front surface of the wafer W by the front surface imaging subunit 160 may be used.

The embodiments disclosed herein are examples in all respects and should not be considered to be restrictive. Various omissions, substitutions and changes may be made in the embodiments without departing from the scope and spirit of the attached claims.

EXPLANATION OF CODES 56 inspection apparatus
220 acquirer
230 calculator
240 estimator

What is claimed is:

1. A warpage amount estimation apparatus for estimating a warpage amount of a substrate, comprising:
   a processor having a memory, the processor is configured to
      acquire a captured image of one surface of an estimation target substrate;
      perform a calculation of a rate of change in pixel value induced by at least an overhang of the estimation target substrate in a substrate radial direction in the captured image of the one surface of the estimation target substrate; and
      perform an estimation of a warpage amount of the estimation target substrate based on a correlation obtained in advance between a rate of change in pixel value induced by the overhang of the estimation target substrate in the substrate radial direction in a captured image of one surface of a substrate, the one surface of the substrate corresponding to the one surface of the estimation target substrate, and a warpage amount of the substrate induced by at least an overhang of the substrate, and on a calculation result of the rate of change which is calculated.

2. The warpage amount estimation apparatus according to claim 1, wherein the processor is further configured to remove a portion within which the rate of change in pixel value exceeds a predetermined threshold from the captured image of the one surface of the estimation substrate, and perform the calculation based on the captured image of the one surface of the estimation target substrate from which the portion has been removed.

3. The warpage amount estimation apparatus according to claim 2, wherein
the portion is predetermined.

4. The warpage amount estimation apparatus according to claim 3, wherein
the processor is further configured to determine the portion in the captured image of the one surface of the estimation target substrate from the captured image of the one surface of the estimation target substrate.

5. The warpage amount estimation apparatus according to claim 4, wherein
the processor is further configured to determine a portion where a pixel value is not within a predetermined range in the captured image of the one surface of the estimation target substrate, to be the portion.

6. The warpage amount estimation apparatus according to claim 5, wherein
the processor is further configured to determine a portion determined to be a defect in defect inspection based on the captured image of the one surface of the estimation target substrate, to be the portion.

7. The warpage amount estimation apparatus according to claim 1, wherein
the processor is further configured to select a region relating to a substrate circumferential direction to be used for the calculation in the captured image of the one surface of the estimation target substrate.

8. The warpage amount estimation apparatus according to claim 7, wherein
the processor is further configured to select a plurality of regions relating to the substrate circumferential direction to be used for the calculation.

9. The warpage amount estimation apparatus according to claim 1, wherein
the processor is further configured to perform the calculation based on a captured image of the one surface of the estimation target substrate averaged in a circumferential direction of the substrate.

10. The warpage amount estimation apparatus according to claim 1, wherein
the processor is further configured to exclude an outlier from pixel values included in the captured image of the one surface of the estimation target substrate to be used for the calculation.

11. The warpage amount estimation apparatus according to claim 1, wherein
the processor is further configured to perform the estimation using correlations which are different from each other according to a diameter of a substrate support on which the estimation target substrate is supported in a manner that a substrate peripheral edge portion overhangs when a camera images the one surface of the estimation target substrate.

12. The warpage amount estimation apparatus according to claim 1, wherein
the processor is further configured to perform the calculation and the estimation, based on a pixel value of a predetermined color.

13. The warpage amount estimation apparatus according to claim 1, wherein
the processor is further configured to calibrate a captured image of a rear surface of the estimation target substrate based on a captured image of the one surface of a calibration substrate without warpage, and perform the calculation based on the calibrated captured image of the rear surface of the estimation target substrate.

14. The warpage amount estimation apparatus according to claim 1, wherein
the captured image is an image obtained by scanning an entire circumference of a peripheral edge portion of a rear surface of the estimation target substrate starting from a predetermined portion of the estimation target substrate.

15. The warpage amount estimation apparatus according to claim 1, wherein
the captured image is acquired from a camera that captures an image which is a reflection of a side end surface of the estimation target substrate.

16. A warpage amount estimation method of estimating a warpage amount of a substrate, comprising:
acquiring, by a processor, a captured image of one surface of an estimation target substrate;
calculating, by the processor, a rate of change in pixel value induced by an overhang of the estimation target substrate in a substrate radial direction in the captured image of the one surface of the estimation target substrate; and
estimating, by the processor, a warpage amount of the estimation target substrate based on a correlation obtained in advance between a rate of change in pixel value induced by the overhang of the estimation target substrate in the substrate radial direction in a captured image of one surface of a substrate, the one surface of the substrate corresponding to the one surface of the estimation target substrate, and a warpage amount of the substrate induced by at least an overhang of the substrate, and on a calculation result of the calculated rate of change in pixel value relating to the substrate radial direction in the captured image of the one surface of the estimation target substrate.

17. The warpage amount estimation method according to claim 16, wherein
the captured image is acquired from a camera that captures an image which is a reflection of a side end surface of the estimation target substrate.

18. The warpage amount estimation method according to claim 16, wherein
the calculation step is based on a captured image of the one surface of the estimation target substrate averaged in a circumferential direction of the substrate.

19. The warpage amount estimation method according to claim 16, wherein
the calculating step excludes an outlier from pixel values included in the captured image of the one surface of the estimation target substrate to be used for the calculation.

20. The warpage amount estimation method according to claim 16, wherein
the estimating step is performed using correlations which are different from each other according to a diameter of a substrate support on which the estimation target substrate is supported in a manner that a substrate peripheral edge portion overhangs when a camera images the one surface of the estimation target substrate.

* * * * *